United States Patent
Zhang et al.

(10) Patent No.: US 9,313,533 B2
(45) Date of Patent: Apr. 12, 2016

(54) AD INVENTORY MANAGEMENT SYSTEM

(71) Applicant: HULU, LLC, Santa Monica, CA (US)

(72) Inventors: Tony T. Zhang, San Diego, CA (US); Wing Chit Mak, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 24 days.

(21) Appl. No.: 13/622,946

(22) Filed: Sep. 19, 2012

(65) Prior Publication Data

US 2014/0082660 A1    Mar. 20, 2014

(51) Int. Cl.
H04N 21/258    (2011.01)
H04N 21/2668   (2011.01)
H04N 21/81     (2011.01)

(52) U.S. Cl.
CPC ....... *H04N 21/258* (2013.01); *H04N 21/25866* (2013.01); *H04N 21/2668* (2013.01); *H04N 21/812* (2013.01)

(58) Field of Classification Search
CPC .................................................. G06Q 30/0269
USPC ....................................................... 705/14.66
See application file for complete search history.

(56) References Cited

U.S. PATENT DOCUMENTS

| | | | | |
|---|---|---|---|---|
| 8,001,004 B2 * | 8/2011 | Protheroe | .............. | G06Q 10/00 705/14.69 |
| 8,307,392 B2 * | 11/2012 | Ahanger | ................ | G06Q 30/02 725/32 |
| 8,577,996 B2 * | 11/2013 | Hughes | ................... | G06F 15/16 709/219 |
| 8,922,559 B2 * | 12/2014 | Charles | ................... | G06F 30/02 345/440 |
| 2003/0225635 A1 * | 12/2003 | Renz | ...................... | G06Q 10/06 705/28 |
| 2005/0137958 A1 * | 6/2005 | Huber | ................... | G06Q 30/02 705/37 |
| 2006/0080171 A1 * | 4/2006 | Jardins | ................. | G06Q 10/087 705/14.68 |
| 2007/0113244 A1 * | 5/2007 | Verschueren | .......... | G06Q 30/02 725/35 |
| 2008/0301727 A1 * | 12/2008 | Cristofalo | .............. | G06Q 30/02 725/35 |
| 2008/0320510 A1 * | 12/2008 | Wong | ................. | H04N 7/17318 725/24 |
| 2010/0114710 A1 * | 5/2010 | Agarwal | ................ | G06Q 10/04 705/14.66 |
| 2011/0251902 A1 * | 10/2011 | Nagarajayya | ...... | G06Q 30/0275 705/14.71 |
| 2011/0258045 A1 * | 10/2011 | Chickering | ............ | G06Q 10/00 705/14.53 |
| 2012/0203625 A1 * | 8/2012 | Soloff | ........................ | 705/14.44 |
| 2014/0022938 A1 * | 1/2014 | Olsen | ........................... | 370/254 |

* cited by examiner

*Primary Examiner* — Thomas M Hammond, III
*Assistant Examiner* — Breffni X Baggot
(74) *Attorney, Agent, or Firm* — Fountainhead Law Group PC

(57) ABSTRACT

Estimating ad inventory in an online video streaming system accurately handles interdependencies among targeted attributes. The estimating includes determining a probability distribution of samples taken from electronic data records of ad impressions in an interactive online video streaming service, among a population comprising each different combination of targeted attributes recorded for each of the samples. In addition, the estimating may include populating an electronic data structure with data relating the each different combination of the targeted attributes to corresponding forecasted number of available impressions in a defined time period, based on the probability distribution and a forecasted total number of available impressions in the time period. Then, estimating the ad inventory is based on the electronic data structure and targeting attributes for an ad campaign, optionally including summing forecasted impressions for combinations of the targeted attributes that include all of the defined set of targeted attributes.

23 Claims, 15 Drawing Sheets

| | | | |
|---|---|---|---|
| Male | 18-29 | LA Metro | 30 |
| Female | 18-29 | NY Metro | 50 |
| Male | 30-54 | LA Metro | 25 |
| Female | 30-54 | NY Metro | 50 |
| Male | 55-69 | LA Metro | 100 |
| Female | 55-69 | NY Metro | 100 |

1310 — DETERMINING A PROBABILITY DISTRIBUTION OF SAMPLES TAKEN FROM ELECTRONIC DATA RECORDS OF AD IMPRESSIONS IN AN INTERACTIVE ONLINE VIDEO STREAMING SERVICE, AMONG A POPULATION COMPRISING EACH DIFFERENT COMBINATION OF TARGETED ATTRIBUTES RECORDED FOR EACH OF THE SAMPLES, USING A COMPUTER ANALYZING THE ELECTRONIC DATA RECORDS

1320 — POPULATING AN ELECTRONIC DATA STRUCTURE IN A COMPUTER MEMORY RELATING THE EACH DIFFERENT COMBINATION OF THE TARGETED ATTRIBUTES TO A FORECASTED NUMBER OF AVAILABLE IMPRESSIONS IN A DEFINED TIME PERIOD, BASED ON THE PROBABILITY DISTRIBUTION AND A FORECASTED TOTAL NUMBER OF AVAILABLE IMPRESSIONS IN THE TIME PERIOD

1330 — ESTIMATING AN INVENTORY NUMBER OF IMPRESSIONS IN A PROGRAM COLLECTION IN THE DEFINED TIME PERIOD AVAILABLE FOR TARGETING ADS TO BE INCLUDED IN STREAMED ONES OF THE PROGRAM COLLECTION PROVIDING AD IMPRESSIONS HAVING A DEFINED SET OF TARGETED ATTRIBUTES, BASED ON THE ELECTRONIC DATA STRUCTURE

1510
ORGANIZING THE FORECASTED NUMBER OF IMPRESSIONS FOR THE EACH DIFFERENT COMBINATION OF THE TARGETED ATTRIBUTES IN THE ELECTRONIC DATA STRUCTURE INTO A STATE TABLE BASED ON IMPRESSIONS PER AD OF MULTIPLE AD PODS DEFINED FOR EACH PROGRAM

1520
DECREMENTING THE FORECASTED NUMBER OF AVAILABLE IMPRESSIONS IN THE TIME PERIOD RELATED TO THE EACH DIFFERENT COMBINATION OF THE TARGETED ATTRIBUTES IN THE ELECTRONIC DATA STRUCTURE, BASED ON AD IMPRESSIONS SOLD

1530
INCLUDING IN THE EACH DIFFERENT COMBINATION OF THE TARGETED ATTRIBUTES AT LEAST TWO DIFFERENT ATTRIBUTES SELECTED FROM THE GROUP CONSISTING OF: VIEWER PROFILE GENDER, VIEWER PROFILE AGE, PROGRAM RECOMMENDATION AGE, VIEWER PREDICTED AGE, VIEWER PREDICTED GENDER, LOCATION OF PLAYER DEVICE, USER PROFILE LOCATION, GENRE OF VIDEO PROGRAM, AND TYPE OF PLAYER DEVICE

1710 — FORECASTING INDIVIDUAL PROGRAMS OF THE PROGRAM COLLECTION AT LEAST WITH RESPECT TO A TIME SCHEDULE OF NEW EPISODES TO BE RELEASED DURING THE TIME PERIOD

1720 — DEFINING A TIME-DEPENDENT PROJECTED VIEWERSHIP FUNCTION FOR EACH PROGRAM

1730 — DEFINING THE TIME-DEPENDENT PROJECTED VIEWERSHIP FUNCTION FOR EACH PROGRAM AT LEAST IN PART BY SUMMING A SERIES OF TIME-DEPENDENT PROJECTED VIEWERSHIP FUNCTIONS FOR INDIVIDUAL EPISODES FORECASTED FOR EACH PROGRAM

1740 — DEFINING EACH OF THE TIME-DEPENDENT PROJECTED VIEWERSHIP FUNCTIONS FOR THE INDIVIDUAL EPISODES AS A LINEAR FUNCTION IN 1/N, WHEREIN 'N' REPRESENTS TIME SINCE INITIAL RELEASE OF A RESPECTIVE CORRESPONDING ONE OF THE INDIVIDUAL EPISODES

1750 — DEFINING THE LINEAR FUNCTION IN 1/N CHARACTERIZED BY C+B/N, WHEREIN 'C' AND 'B' ARE CONSTANTS

1760 — DETERMINING A VALUE FOR THE CONSTANTS 'C' AND 'B' BY ANALYZING VIEWERSHIP RECORDS FOR THE INDIVIDUAL EPISODES OF EACH PROGRAM

1770 — DETERMINING THE TOTAL PROJECTED VIEWERSHIP FOR EACH PROGRAM IN THE TIME PERIOD AS ELECTRONIC DATA STORED IN A COMPUTER MEMORY, BY INTEGRATING THE TIME-DEPENDENT PROJECTED VIEWERSHIP FUNCTION FOR EACH PROGRAM OVER THE TIME PERIOD

AD INVENTORY MANAGEMENT SYSTEM

FIELD

The present application relates generally to input/output processing using a computer, and more particularly management of ad inventory in an online video system.

BACKGROUND

Advertising-supported distribution of audio-video data may be implemented from a content server to remote client devices over computer networks, telecommunications networks, and combinations of such networks, using various methods, for example progressive downloading or streaming. Platforms for such distribution may include sites that offer a great variety of different programming, including both newly released episodes of serial programs, major features, documentaries, special events, archives of past episodes and classic serial programs, of different types targeted to users having various different demographic profiles or located in different area, and in various formats for use on different kinds of player devices. One or more video ads may be inserted into each video program and sold to advertisers who are charged based on how many times each advertisement is played on a client device; i.e., for each video ad impression.

Prospectively, it may be desirable to provide estimates to advertisers concerning how many ad impressions are available for purchase in a particular future time period for a defined target, which target may be defined by various attributes, for example, demographic, geographic, program format, program genre, or time-of-day. Such information, sometimes referred to as "ad inventory" may be useful for planning advertising costs/revenues and generally facilitating commerce. However, because of the complexities of sophisticated video content platforms, prior methods of estimating ad inventory in a streaming video system may be inaccurate. For example, prior methods may assume that targeted attributes can be handled independently for estimating purposes, and may become inaccurate when the targeted attribute exhibits a degree of interdependence. Consequently, management of ad inventory based on prior estimation methods may be prone to problems such as unanticipated surpluses or shortages of ad inventory, or high uncertainty. These and other limitations of prior methods for estimating and managing ad inventory in a streaming video system may be overcome by the novel methods and apparatus disclosed herein.

SUMMARY

Methods, apparatus and systems for estimating and managing ad inventory in an online video distribution system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for estimating ad inventory in an online video distribution system may include determining a probability distribution of samples taken from electronic data records of ad impressions in an interactive online video streaming service, among a population comprising each different combination of targeted attributes recorded for each of the samples, using a computer analyzing the electronic data records. The method may further include populating an electronic data structure in a computer memory relating the each different combination of the targeted attributes to a forecasted number of available impressions in a defined time period, based on the probability distribution and a forecasted total number of available impressions in the time period. The method may further include estimating an inventory number of impressions in a program collection in the defined time period available for targeting ads to be included in streamed ones of the program collection providing ad impressions having a defined set of targeted attributes, based on the electronic data structure.

The method may include decrementing the forecasted number of available impressions in the time period related to the each different combination of the targeted attributes in the electronic data structure, based on ad impressions sold. The method may further include receiving user input defining the defined set of targeted attributes and the time period via a user interface device, and outputting the inventory number to an output device in response to the user input.

Further aspects of the method for estimating ad inventory in an online video distribution system may include identifying a combination set of the each different combination of the targeted attributes in the electronic data structure, wherein each member of the combination set includes all of the defined set of targeted attributes. Estimating the inventory may include aggregating the forecasted number of available impressions in the time period over the combination set.

In another aspect, the method may include translating the defined set of targeted attributes targeted by an ad campaign into a bit mask. In such case, identifying the combination set may be performed at least in part by applying the bit mask to the electronic data structure. The method may also include organizing the forecasted number of impressions for the each different combination of the targeted attributes in the electronic data structure into a state table based on impressions per ad of multiple ad pods defined for each program.

Aspects of the method may further include forecasting individual programs of the program collection at least with respect to a time schedule of new episodes to be released during the time period. For example, the method may include defining a time-dependent projected viewership function for each program. The time-dependent projected viewership function for each program may be defined at least in part by summing a series of time-dependent projected viewership functions for individual episodes forecasted for each program. For example, each of the time-dependent projected viewership functions for the individual episodes may be defined as a linear function in 1/N, wherein 'N' represents time since initial release of a respective corresponding one of the individual episodes. In such embodiments, the method may include defining the linear function in 1/N characterized by C+B/N, wherein 'C' and 'B' are constants, and determining a value for the constants 'C' and 'B' by analyzing viewership records for the individual episodes of each program. In addition, the method may include determining the total projected viewership for each program in the time period as electronic data stored in a computer memory, by integrating the time-dependent projected viewership function for each program over the time period.

In related aspects, a computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for estimating and managing ad inventory in an online video distribution system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. Like element numerals may be used to indicate like elements appearing in one or more of the figures.

FIGS. 13-17 are diagrams illustrating operations that may be performed by a computer server for ad inventory management.

DETAILED DESCRIPTION

Figure 1:
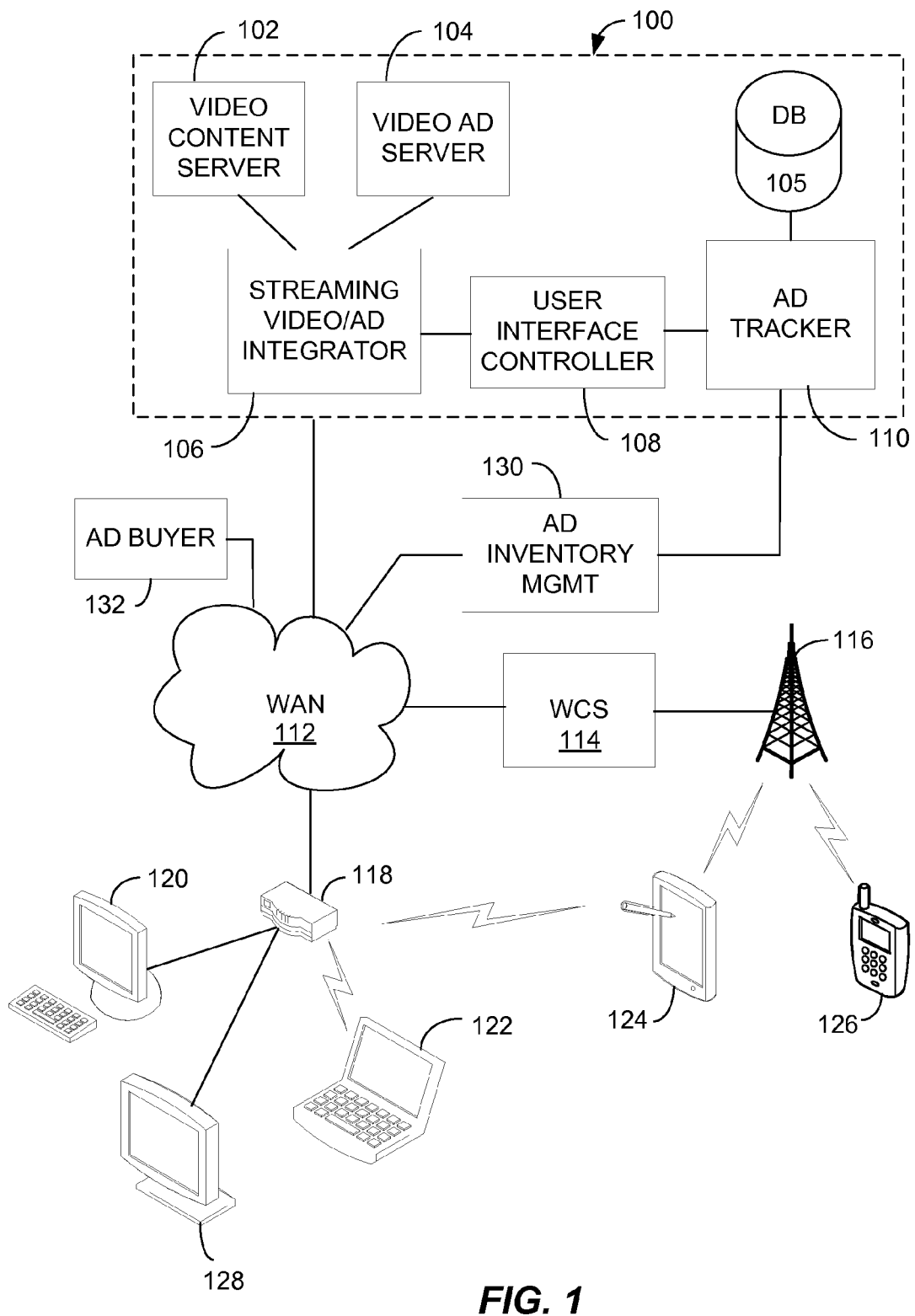
FIG. 1 is a schematic diagram illustrating an embodiment of a computing environment in which systems and methods discussed herein may be implemented.

In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. Unlike progressive downloading, streaming media can be delivered on-demand or live. Progressive downloading may require downloading the entire file or downloading enough of the entire file to start playback at the beginning. In contrast, streaming may enable immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server 100 may be defined as a specialized device that accepts requests for video files, and based on information about the format, bandwidth and structure of those files, serves an amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages may include commands for enabling control functions such as fast forward, fast reverse, pausing, or seeking to a particular part of the file at the client. Since a streaming media server may transmit video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests.

Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players at the client do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." An ad break reserved for one or more video ads to be played in uninterrupted sequence may also be referred to as an "ad pod." With streaming video, the media player may be configured so that the client device cannot play the video without also playing predetermined advertisements during the designated ad slots.

For example, the video streaming system 100 may include one or more computer servers or modules 102, 104, 106, 108 and/or 110 distributed over one or more computers. Each server 102, 104, 110 may include, or may be operatively coupled to, one or more data stores, for example database 105, indexes, files, or other data structures. A video content server 102 may access a data store of various video segments; for example, newly released and archived television episodes, motion pictures, and other content produced as primary content of interest to consumers. The video content server 102 may serve the video segments as directed by a user interface controller module 108.

A video advertising server 104 may access a data store of relatively short video segments (e.g., 10 second, 30 second, or 60 second video advertisements) configured as advertising for a particular advertiser or message. The advertising may be provided for an advertiser in exchange for payment of same kind, or may comprise a promotional message for the system 100, a public service message, or some other information. The ad server 104 may serve the video advertising segments as directed by the user interface controller 108.

An advertising tracking server 110 may keep track of program and advertising views for video content streamed from the system 100 to client devices. Client devices may be configured to transmit a first signal, sometimes referred to as a "start beacon" to the system 100 (e.g., to ad tracker 110) at the onset of each video segment playing on the client. Similarly, the client may transmit a second signal, sometime called an "end beacon" to the system when a video segment has finished playing on the client device. The ad tracking server 110 may process start and end beacons for video ads received by the system 100, together with information concerning the program and user profiles which with each beacon is associated, to develop records regarding video advertising views related to program type, program identifier, user demographic, location of client device or user account, player device type, and other associated information. The ad tracking server 110 may store these records in a data structure, for example in a relational database 105.

The video streaming system 100 may include, or be communicatively coupled to, an ad inventory management server 130. The ad inventory management server may be communicatively coupled to one or more network nodes 132 for prospective ad buyers via WAN 112 or other connection. The ad buyer node 132 may operate a terminal interface or message system for communicating with an ad inventory module operating in the server 130. A person wishing to purchase distribution of a particular video ad or set of video ads for an ad campaign may send an inquiry to the ad inventory management server 130, based on parameters as more particularly described herein. The ad inventory management server 130 may receive and process such queries to determine available ad inventory and provide estimates in response to such queries. During such processing, the inventory management server 130 may communicate with the ad tracker 110 and/or the database 105 to obtain access to historical data concerning video advertising views in relation to specific programs, user demographics or other targeted attributes. The inventory management server may use the historical data to provide a basis for estimating ad inventory for some defined future time period.

As used herein, "ad inventory" does not refer to a definite, countable quantity of already-produced items such as might be stored in a warehouse. Each ad impression made by a streaming video ad is consumed the instant it is produced, so there can no store of inventory. Instead, as understood in the art and as used herein, "ad inventory" refers to a quantity of future ad impressions estimated to be available in a streaming video system during some defined future time period. Estimations may be based on a current state of the system, historical data regarding ad impressions, and/or other parameters. Ad inventory may be restricted to and thereby partly defined by a targeted audience based on selected demographic, geographic, or other targeted parameters. For example, ad inventory may be estimated for video programs targeted to a particular geographic region, user demographic, program genre, program assumed viewer profile, data format, client type, time-of-day, or any other attribute useful for targeting advertising.

The video streaming system 100 may further include an integrator component 106 that integrates video content and video advertising into a streaming video segment as directed by the controller 108. The controller 108 may determine the selection or configuration of advertising in the streaming video based on any suitable algorithm or process, and provide ad tracking data to the ad tracker 110. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the video streaming system 100 via a router 118 for a LAN, via a base station 116 for a wireless telephony network 114, or via some other connection or combination of connections. In operation, such client devices 120, 122, 124, 126, 128 may send and receive data or instructions to the system 100, in response to user input received from user input devices or other input. In response, the system 100 may serve video program segments and selected video advertising content to the client devices 120, 122, 124, 126, 128. The devices 120, 122, 124, 126, 128 may output video content from the streaming video programs and video advertising segments using a display screen, projector, or other video output device. In certain embodiments, the system 100 configured in accordance with the features and aspects disclosed herein may be configured to operate within or support a cloud computing environment. For example, a portion of, or all of, the servers 102, 104 or 110 may reside in a cloud server.

Figure 2:
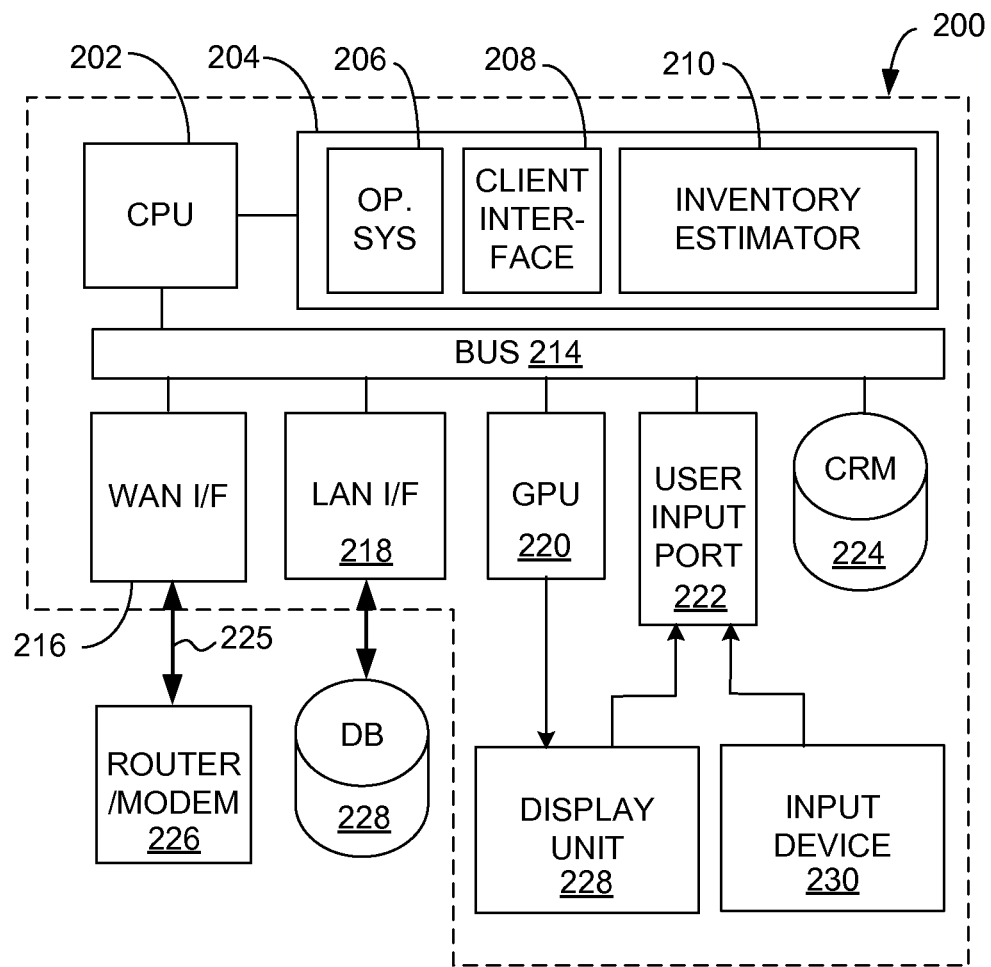
FIG. 2 is a schematic block diagram illustrating an embodiment of a network computing device for supporting and executing the systems and methods described herein.

Referring to FIG. 2, a diagrammatic view of an example ad inventory management server 200 is illustrated. For example, the server 130 or system 100 shown in FIG. 1 may be configured as or include such ad inventory management server 200, which may also be referred to as a computer, server, or computer server. In selected embodiments, the ad inventory management server 200 may include a processor 202 operatively coupled to a processor memory 204, which holds binary-coded functional modules for execution by the processor 202. Such functional modules may include an operating system 206 for handling system functions such as input/output and memory access, a client interface 208 for communicating with one or more ad buyer clients (e.g., ad buyer 132 as shown in FIG. 1), and an ad inventory estimator module 210 for determining estimates of available ad inventories based on a current system state including future program schedules and libraries, historical ad viewing data, and queries received via the client interface module 208.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the ad inventory management server 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the ad inventory management server 200 to perform one or more operations of a method as described herein.

A communication interface 216 may also be connected to the bus 214. The communication interface 216 may provide or support two-way data communication between the ad inventory management server 200 and one or more external devices, e.g., the streaming system 100 or ad buyer node 132, optionally via a router/modem 226 or other connection. In the alternative, or in addition, the ad inventory management server 200 may include a Local Area Network (LAN) interface 218 communicatively coupled to a database server 228, from which the server 200 may obtain information regarding system content libraries and schedules and historical ad view data categorized by any useful targeted attribute, for processing to provide ad inventory estimates.

The ad inventory management server 200 may be connected (e.g., via the bus 214 and graphics processing unit 220) to a display component 228. A display component 228 may include any suitable configuration for displaying information to a user of the ad inventory management server 200. For example, a display component 228 may include or utilize a liquid crystal display (LCD), touchscreen LCD (e.g., capacitive display), light emitting diode (LED) display, projector, cathode ray tube (CRT), or other display device to present information to a user of the ad inventory management server 200 in a visual display.

One or more input devices 230 (e.g., an alphanumeric keyboard, microphone, keypad, remote controller, touchscreen, camera or camera array) may be connected to the bus 214 via a user input port 222 to communicate information and commands to the server 200. In selected embodiments, an input device 230 may provide or support control over user selection input, for example, control of a cursor or highlight. Such a selection indicator control device, for example a pointing device, may be configured as a mouse, a trackball, a track pad, touchscreen, cursor direction keys or other device for receiving or tracking physical movement and translating the movement into electrical signals indicating movement of a user selection indicator. The selection indicator control device may be incorporated into the display unit 228, for example using a touch sensitive screen. A selection indicator control device may communicate direction information and command selections to the processor 202 and control selection indicator movement on the display 228. A selection indicator control device may have two or more degrees of freedom, for example allowing the device to specify selection indicator positions in a plane or three-dimensional space.

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

Figure 3:
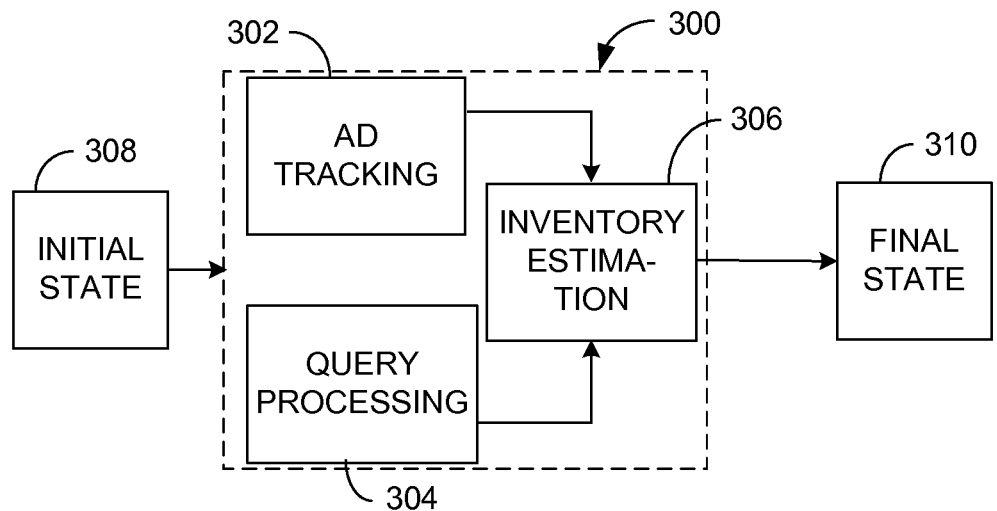
FIG. 3 is a state diagram illustrating general aspects of an ad inventory management process.

Referring to FIG. 3, general aspects of an ad inventory management process 300 used for providing estimates of ad inventory for future video ads expected to be viewed by users of a streaming video system are illustrated as a state diagram. The initial state 308 represents a current state of available programs, content libraries, and historical ad view data for a particular video streaming service at a particular point in time, plus an ad query for a defined future time and specified targeted attributes, which may include, for example, user demographic, program type, player device type, or player device location. The initial state 308 may be represented in a computer memory in various ways, for example by a database of library content characterized by type, schedule of expected future new releases, historical ad views broken down by program and targeted attribute, and a structured query form. It should be appreciated that the server system state is constantly changing as users continue to access the streaming system, new content is added, and old content deleted, and the initial state 308 may therefore represent a system state as it exists at a particular instant of time, for example at the time that a query requesting an estimate of ad inventory is submitted to the system. It should be appreciated that the initial state 308 represents a particular physical state based on video content representative of physical display output, records of past events defined by physical interactions with client devices, and a record defining a query inferred from physical inputs to a query client machine.

The inventory management process 300 is (or includes) an input-output computation process performed by a computer processor, which operates on the initial state 308 to output at least one final state 310. The final state 310 represents a particular ad inventory estimate determined from the state data 308, i.e., from a defined physical state. The ad estimate represents an amount of a physical resource, for example "end beacon" events for video ads predicted to occur on physical client machines in a defined future time period, computed in a deterministic manner from the initial physical state 308. In that sense, the inventory management process 300 determines an estimate of the amount of a physical resource (ad inventory) that will be contained in a physical medium (a defined targeted ad space) based on physical measurement data (historical data). The process 300 may therefore operate as a state machine that accepts the initial state 308 representing a physical state of a streaming video system and transforms it into a final state 310 representing a related physical quantity. Subsequently, the final output state 310 being an estimate of a future physical state can be fulfilled in physical outputs from clients connected to a video streaming service, for example by inserting particular video advertisements into selected content streamed from the system at a managed rate determined by the estimate.

The ad inventory management process 300 may include several interactive modules, for example, a historical ad tracking module 302, a query processing module 304 and an inventory estimation module 306. The module 300 may include other modules, for example, a user interface module, commerce module, graphics module, etc., which for illustrative simplicity are not shown.

The ad tracking module 302 may record ad viewing events based on signals received from client devices, for example start beacons and end beacons, and gather information regarding program and user parameters. Such parameters may include, for example, program type or genre, program length, physical location or estimated physical location of the client device; or demographic factors such as age, gender, education level; and interest or preference data. The module 302 may determine location parameters by network address, GPS or cellular triangulation, user self reporting via a questionnaire, or other method. The module 302 may determine demographic or interest parameters by user self reporting via a questionnaire, user profile, analyzing past browsing, video viewing, or ad selection history, or other method. The module 302 may further gather program parameters for programs in which video ads are viewed, and record viewing data in a relational database. In addition, the ad tracker module 302 may, through an administrative interface, participate in configuring or maintaining the relational database or data structure.

The query processing module 304 may receive and process a query requesting a particular ad inventory estimate. This module 304 may serve a data collection form to gather structured query parameters, and/or process query strings using a predefined syntax. Query parameters may include, for example, definition of a future period for a prospective ad campaign, number of impressions desired, and one or more targeted attributes for an ad campaign.

The inventory estimation module 306 may receive inputs from the ad tracking module 302 and the query module 304, and use those inputs for determining an ad inventory estimate based on a time model of future ad impressions determined from a current system state. The inventory estimation module 306 may operate an algorithm operating on the inputs based on the time model to produce the estimate. Examples of suitable algorithms are provided in the detailed description below. The inventory estimation module 306 may output a data signal indicating a value of the resulting estimated ad inventory, which may be stored in a computer memory and/or displayed using a computer display device.

Figure 4:
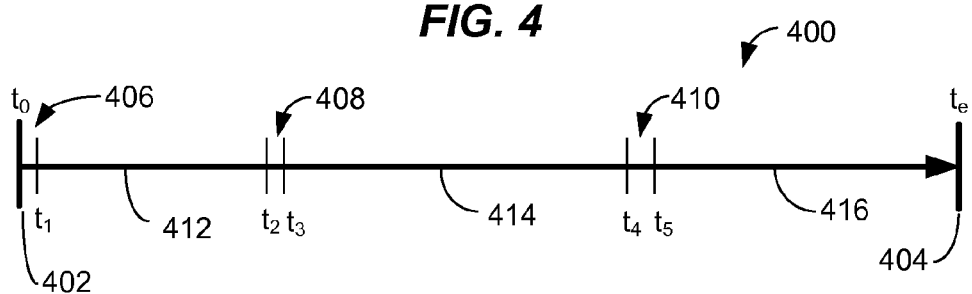
FIG. 4 is a line diagram illustrating aspects of a video segment including ad slots.

Ad inventory estimation may be related to patterns such as video streaming systems adopt for inserting video ads in program content. FIG. 4 is a line diagram illustrating aspects of a video segment timeline 400 including an example of a pattern including ad slots 406, 408 and 410, sometimes referred to as "ad pods." A video segment includes video data characterized by a sequence of video frames that are output in order at a defined frame rate to generate video output. As such, a video segment includes an initial or first frame at inception time "$t_0$" 402 of video output, and each subsequent frame is output at a defined time "t" after inception until a terminal or end time "$t_e$" 404. Thus, each frame defines a particular time or "temporal point" in the streaming video segment, typically measured from the time of inception. For example, for a video configured for 30 frames per second, the $300^{th}$ frame defines a temporal point 10 seconds after inception. A temporal point in a streaming video segment may sometime be referred to herein as a "location" in relation to a progress bar, time line or other time indicator.

Any non-negative, integral number of ad slots 406, 408 and 410 may be configured in the video time line. Each ad slot may be defined by a location and duration. For example, the first ad slot 406 is located at "$t_0$" and has a duration of "$t_1-t_0$"; the second ad slot 408 is located at "$t_2$" and has a duration of "$t_3-t_2$"; and the third ad slot 410 is located at "$t_4$" and has a duration of "$t_5-t_4$". The inter-slot portions 412, 414 and 416 are used for playing requesting video content, and the ad slots are used for playing video advertisements. A streaming media player operating on the client device may cause the video content to play in the defined inter-slot portions 412, 414, 416 and stream advertising videos of appropriate duration in all of the ad slots 406, 408, 410.

Figure 5:
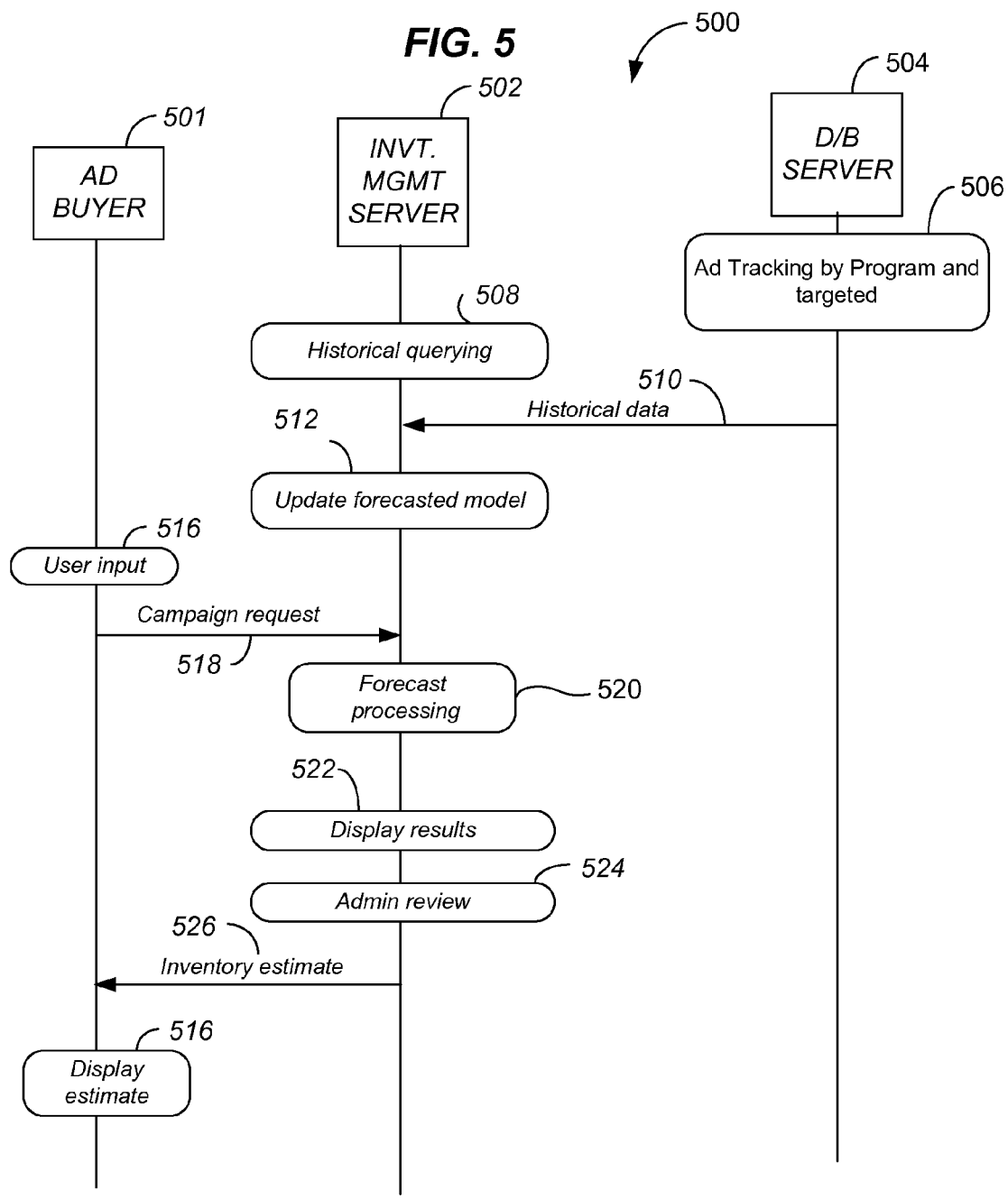
FIG. 5 is a sequence diagram illustrating an example of a call flow between system components in a sequence for ad inventory management in a video streaming system.

FIG. 5 illustrates an example of a call flow 500 between an ad buyer node 501, an inventory management server 502, and a database server 506 for estimating and managing ad inventory based on a current state of a video streaming system. The servers 501, 502 and 504 may each be, or may include, a computing device including one or more processors coupled to a memory and other components as described in more detail herein, or as known in the art. As prelude to the call flow 500, an example of call flow for video streaming provided by a video streaming server through a web page interface and streaming media players installed at numerous client devices is first described without reference to a figure. The inventive concepts herein are not limited to such environments.

If a web page environment is used, a call flow may initiate with the client devices (not shown) displaying a web (e.g., World Wide Web) page received from a video streaming system (also not shown) including links for requesting one or more video segments. For example, the web page may comprise a "home" or personalized page including a list of selected video segments of general interest, or selected as likely to be of interest to a specific user based on a user profile. The client device may receive user input selecting one of the links, for example, a "point and click" input from a pointing device, a touch input on a touchscreen device, or a spoken command. In response to the input, the client device may request a specific video segment by transmitting a Hypertext Transfer Protocol (HTTP) "get" request, or other suitable request message, to the video streaming system.

In response to receiving the request message, the video streaming system may determine a selection of advertising videos and ad slots for the video segment requested by the request message. In so doing, the server system may access a record pertaining to user preferences or past activity by a user identified, for example by a user account, as making the request for the video segment. Any suitable method may be used to select the video advertisements, which may include consideration of user input and related communication between each client and the video streaming server. An output of the determining process may include video ad identifiers included in streaming data.

The streaming video system may stream the video segment configured with video advertising. The client device may play the streaming video segment configured with video advertising at designated ad slots using a media player component. Video advertisements may be selected by the streaming video system just prior to each ad slot being encountered at the client, or in advance of initiation of a streaming session. Each client device may play each streaming video until reaching one or more designated ad slots. In some embodiments clients may request a video ad in response to detecting the beginning of a designated ad slot, such as, for example, about five seconds before reaching the ad slot during play of a streaming video. An ad server of the video streaming system may serve the video ad to clients in response to each request. In alternative embodiments, an ad server may automatically select and include a streaming video ad in the content streamed to the client device, without responding to a request from the client for a video ad. When each client has finished playing an ad, it may transmit an end beacon to an ad server. Upon receiving each such end beacon, the ad server may create a record including at least an identifier for the program and video ad, and time the end beacon was received. In addition, the record may include a user or session identifier and other information. The ad server may continually provide such records to the database server 504 operating an ad tracking process 506. Using a relational data structure, each end beacon event record may thereby be related, via included program, user, or session identifiers to one or more targeted attributes, for example, demographic or geographic parameters, device type, or program genre. The database server 504 may maintain all such records in a data structure, or compress the records using a counting process to keep a more limited set of counting data of ad impressions for each targeted attribute and program, in particular time increments.

Periodically, or in response to defined events, the inventory management server may update a time model used for forecasting ad inventory. As part of an update, the server 502 may perform historical querying 508 and obtain requested historical ad viewing data 510 from the database server 504. The inventory management server 502 may test a current forecasted model against historical data, and adjust (update) parameters of the forecasted model 512, so that the model better matches historical measured results for recent comparable time periods. This model adjustment process 512 may therefore adjust for dependencies that may exist between different targeted attributes in the historical data, assuming such dependencies are likely to be repeated in future episodes of the same or similar shows. For example, dependencies between a viewer's gender and the identity of a program in which an advertisement viewing event occurs can be accounted for using a targeting cut table as described in the specification below.

From time to time an ad buying node 501 may receive user input 516 generating a query or ad campaign request 518, which is transmitted to inventory server 502. In response, the server 502 may process the request 520 using campaign parameters (e.g., attributes of targeted viewers, geographic area, and time period) using the most current forecasted model to obtain a resulting inventory estimate, which it may display 522 to a system administrator. A system administrator may compare the requested ad buy to the estimated inventory 524, and if sufficient inventory exists, reserve the requested inventory for the ad buy. Conversely, if insufficient inventory exists in the specified time frame for the ad campaign, the administrator may contact the ad buyer to define alternative campaign parameters for a second estimate. In either case, the inventory management server 502 may transmit 526 an inventory estimate to the ad buyer node 501. The ad buyer node 501 may display details of the inventory estimate, which if necessary may guide the ad buyer into redefining ad campaign details to ensure that sufficient inventory is available to carry out the contemplated campaign. Thus, an inventory estimation process at the server 502 may be used manage allocation of ad inventory of the streaming video system for one or more ad campaigns.

Figure 6:
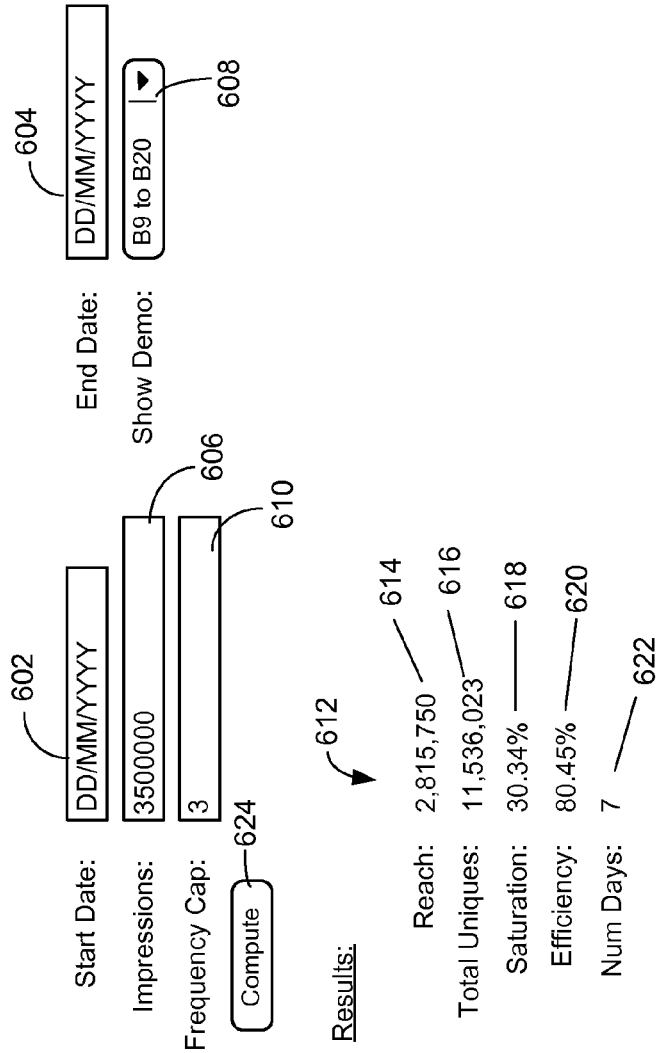
FIG. 6 is a screenshot illustrating a form for defining an ad campaign and displaying results of an ad inventory analysis in a graphical user interface of a system for performing ad inventory management.

Referring to FIG. 6, an example of a form 600 for defining an ad campaign and displaying results of an ad inventory analysis illustrates examples of possible inputs and outputs of the present technical methods. A first text box 602 may be included in the form 600 enabling user input specifying a start date for a prospective video ad campaign, with a second text box 604 enabling user input specifying an end date. A third text box 606 may be included enabling user entry of a total number of ad impressions (views) to be achieved by the prospective ad campaign. A selection object 608 (e.g., drop-down list) may also be included in the form 600, enabling user input specifying one or more programs, program types, or groups of video programs that are to be included in the video ad campaign. A fourth text box 610 may be included enabling user entry of a frequency cap, specifying a maximum frequency for campaign ads appearing in the same video program. By activating an interactive object such as the compute button 624, an ad buyer may cause an application providing the form 600 to transmit a signal to an ad inventory estimation module, thereby initiating an estimation process based on the entered parameters.

Results 612 may be displayed in another portion of the form 600, or in a separate window, after the ad estimation module has completed operation. Examples of estimation results are provided for purposes of illustration in FIG. 6. A first result, "Reach" 614 indicates an estimated number of unique viewers who will view at least one of the video ads in the specified campaign. In the illustrated example, a reach of approximately 1.2 million users is estimated at 614 for an ad campaign of 1.5 million impressions as specified in box 606. A second result, "Total Uniques" 616 indicates a total number of unique users estimated to be reachable in the time period defined by the dates indicated in boxes 602, 604 and by the programs selected at 608. A third result, "Saturation" 618 is the ratio of Reach 614 to Total Uniques 616. A fourth result, "Efficiency" is the ratio of Reach 614 to the total impressions indicated in box 606. A number of days 622 counted in the defined campaign period is indicated for convenience at the bottom of the results 612.

Figure 7:
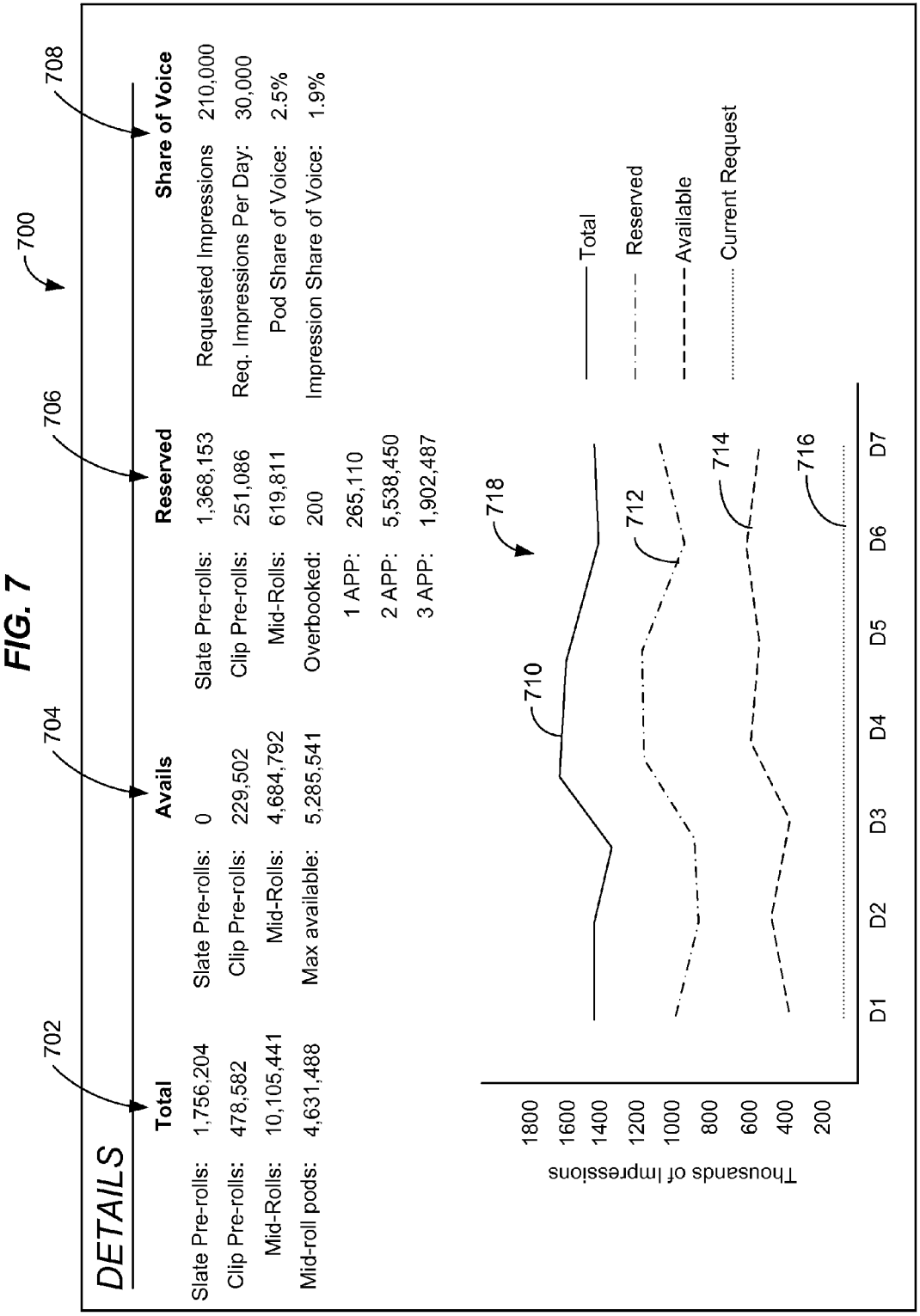
FIG. 7 is a screenshot illustrating a mixed textual and graphical display of an ad inventory analysis in a graphical user interface of a system for performing ad inventory management.

Referring to FIG. 7, a window 700 including a mixed textual and graphical display of ad inventory analysis results is illustrated, as an example showing capabilities of the present technology. A first column 702 includes a breakdown total inventory (both committed and uncommitted) for a particular ad campaign such as may be defined using the form 600 previously described. The column 702 may list, for example, total ad inventory in the specified time period for different classifications or types of ad inventory. Examples of different types of ad inventory may include, for example, types based on position of the inventory in the ad pod, program clip, or ad slate. A second column 704 may list, for example, available (uncommitted) inventory for each of the ad types. A third column 706 may list, for example, reserved (committed) inventory for each of the ad types and overbooked inventory (if any). The column 706 may also include a breakdown of the committed inventory in terms of Ads-Per-Pod (APP), for example 1 APP, 2 APP and 3 APP. A fourth column 708 may list parameters and statistics pertinent to share of voice for the defined ad campaign, for example total impressions, requested impressions per day, pod share of voice, and impression share of voice.

The window 700 may also include a chart 718 or similar object showing inventory estimates broken down per time period, such as daily or hourly. For example, the line chart 718 includes a first line 710 representing total inventory per day, a second line 712 representing reserved inventory per day, an third line 714 representing available inventory per day, and a fourth line 716 representing the requested current ad campaign in impressions per day.

Figure 8:
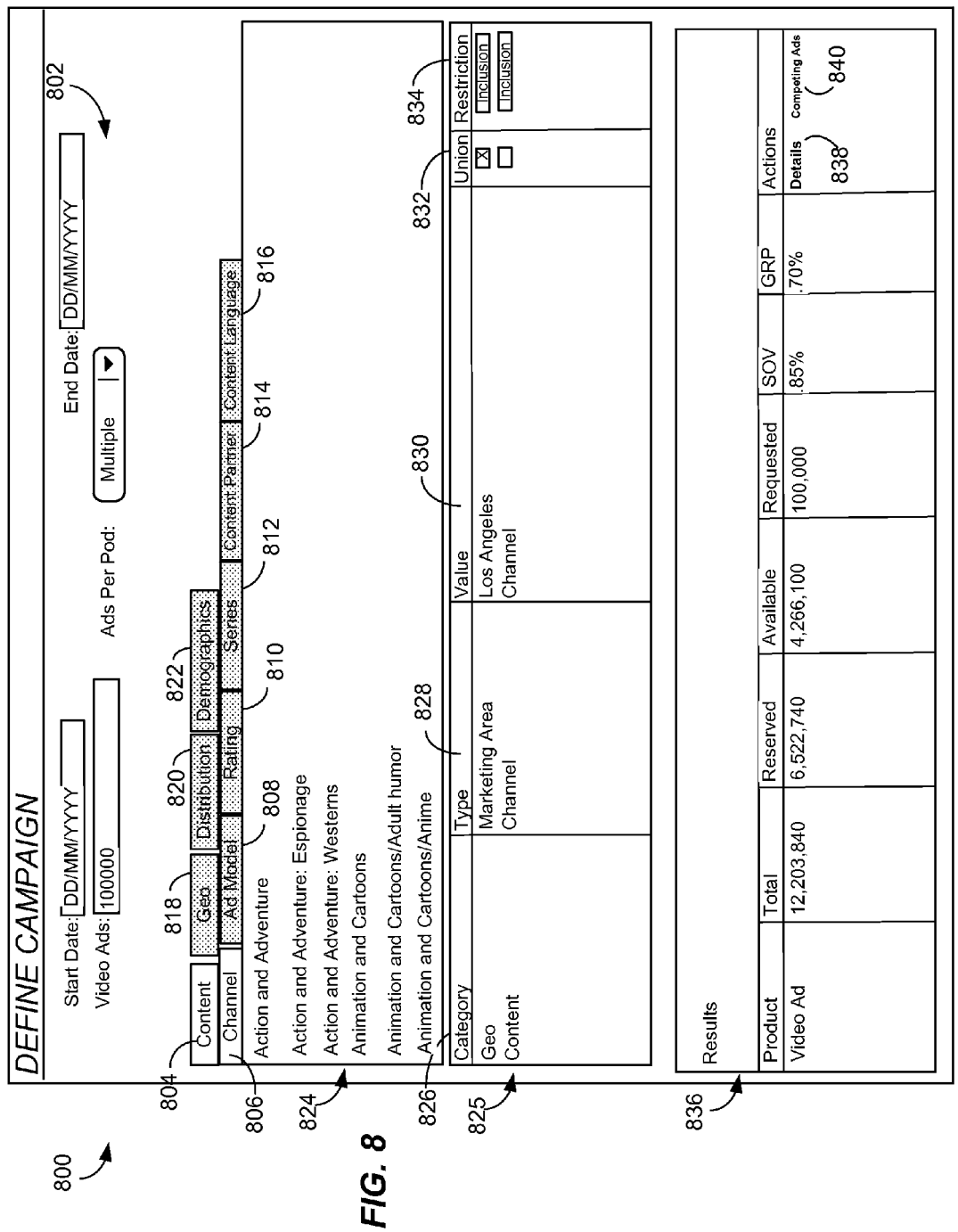
FIG. 8 is a screenshot illustrating an input form for defining detailed parameters of an ad campaign in a graphical user interface of a system for performing ad inventory management.

A user interface provided for defining ad campaigns may include additional features enabling an ad buyer to define an ad campaign in a more detailed way. For example, FIG. 8 illustrates an example of an input form 800 for defining more detailed parameters of an ad campaign. The form 800 may include text blocks or other interactive features 802 enabling the user to specify a date range, number of impressions, maximum ads per pod, and optionally ad slate parameters for an ad campaign.

In addition, the form 800 may include a parameter definition window or frame 824 for receiving user input specifying the scope of an ad campaign by limiting the campaign to selected programs, program types, client device types, geographic areas, distribution, user demographic, or other attributes. For example, a content tab 804 may link to a set of sub-tabs categorically organizing video content attributes. In the illustrated example, the content tab 804 links to a site channel sub-tab 806, an ad model sub-tab 808, a content rating sub-tab 810, a program series sub-tab 812, a content partner sub-tab 814 and a content language sub-tab 816. A list of selectable attributes pertinent to each sub-tab may be listed when the sub-tab is highlighted. For example, with the site channel sub-tab 806 selected, a listing of all the available content channels on the video streaming system is presented. By selecting one or more of the listed channels, the submitted ad campaign and related ad inventory estimation process may be limited to the selected channels. Similarly, corresponding sub-tabs and parameter lists may be linked to other tabs for different attribute categories, for example a geography tab 818 for attributes related to places where program content is distributed, a distribution tab 820 for attributes related to channels or media through which content is distributed, and a demographics tab 822 for attributes related to targeted user demographics.

The selectable attributes may be the same, or may correlate to, attributes tracked for historical ad impressions. For example, in some embodiments, each ad impression may be tagged with six different demographic attribute types, such as gender, profile age (user's stated age), recommendation age (apparent age based on types of programs watched), program demographic, predicted demographic, combination of age and gender, or combinations of these or other demographic attributes. Other attributes may also be used. For example, a "location" attribute type may have values of marketing area (DMA), city, state, zip code, or other geographic region. A "content" attribute type may have the value of genre, content partner, or rating. A "time" attribute type may have the value of episode or clip length, or time of day. A "platform" attribute type may have the value of mobile or full. A "profile" attribute type may have the value of subscription type or language. An "ad type" attribute type may have the value of full screen or pop out. It should be appreciated that the foregoing attribute values and types are merely examples, and additional or different attribute values and types may be used for tagging ad impressions and characterizing ad campaigns in a streaming video system.

A query definition window 825 may list selected attributes and logic defining the query and ad campaign. A sequence of attributes related by logical (e.g., Boolean) operators may be used, with the parameters specified at 802, to define an ad campaign and hence the query used for estimating ad inventory pertinent to a defined campaign. For example, a category column 826 may list categories of selected attributes. The categories listed in the columns 826 may correspond to the tabs (e.g., tabs 804 and 818) presented in the superior window 824. A type column 828 may list types of selected attributes, corresponding to the sub-tabs presented above. A value column 830 may list the values of the selected attributes.

A first logical operator column 832 may enable activation of one or more set operators, for example "union" indicating that the presence of the attribute is sufficient (logical "OR") to qualify or disqualify inventory for use in the ad campaign depending on the value of the restriction operator in column 834. Specifically, if the restriction operator 834 is set to "inclusion" and the set operator 832 to "union," then the presence of the attribute will qualify the inventory for use. Conversely if the restriction operator 834 is set to "exclusion" and the set operator 832 to "union," then the presence of the attribute will be sufficient to disqualify the inventory for use.

On the other hand, if the set operator 832 is set to "not union" (e.g., if "union is not selected") the presence of the attribute is necessary but not sufficient (logical "AND") to qualify or disqualify inventory for use in the ad campaign depending on the value of the restriction operator in column 834. Specifically, if the restriction operator 834 is set to "inclusion" and the set operator 832 to "not union," then the presence of the attribute will qualify the inventory for use only if the other listed attributes set for inclusion are also present. Conversely if the restriction operator 834 is set to "exclusion" and the set operator 832 to "not union," then the presence of the attribute will disqualify the inventory for use only if the other listed attributes set for exclusion are also present. In the alternative, or in addition, other methods for expressing relationships between attributes and logical operators may be used, for example traditional Boolean expressions.

Results of an ad inventory analysis may be presented in a lower window 836, which contains example values similar to those described in the prior FIGS. 6-7. In addition, the results may include a link 838 to a detailed results window as shown in FIG. 7. The results may also include a link 840 to a display window showing a breakdown of competing video ads for the inventory during the ad campaign, which may be useful for avoiding undesirable overlaps between competing campaigns.

Figure 9:
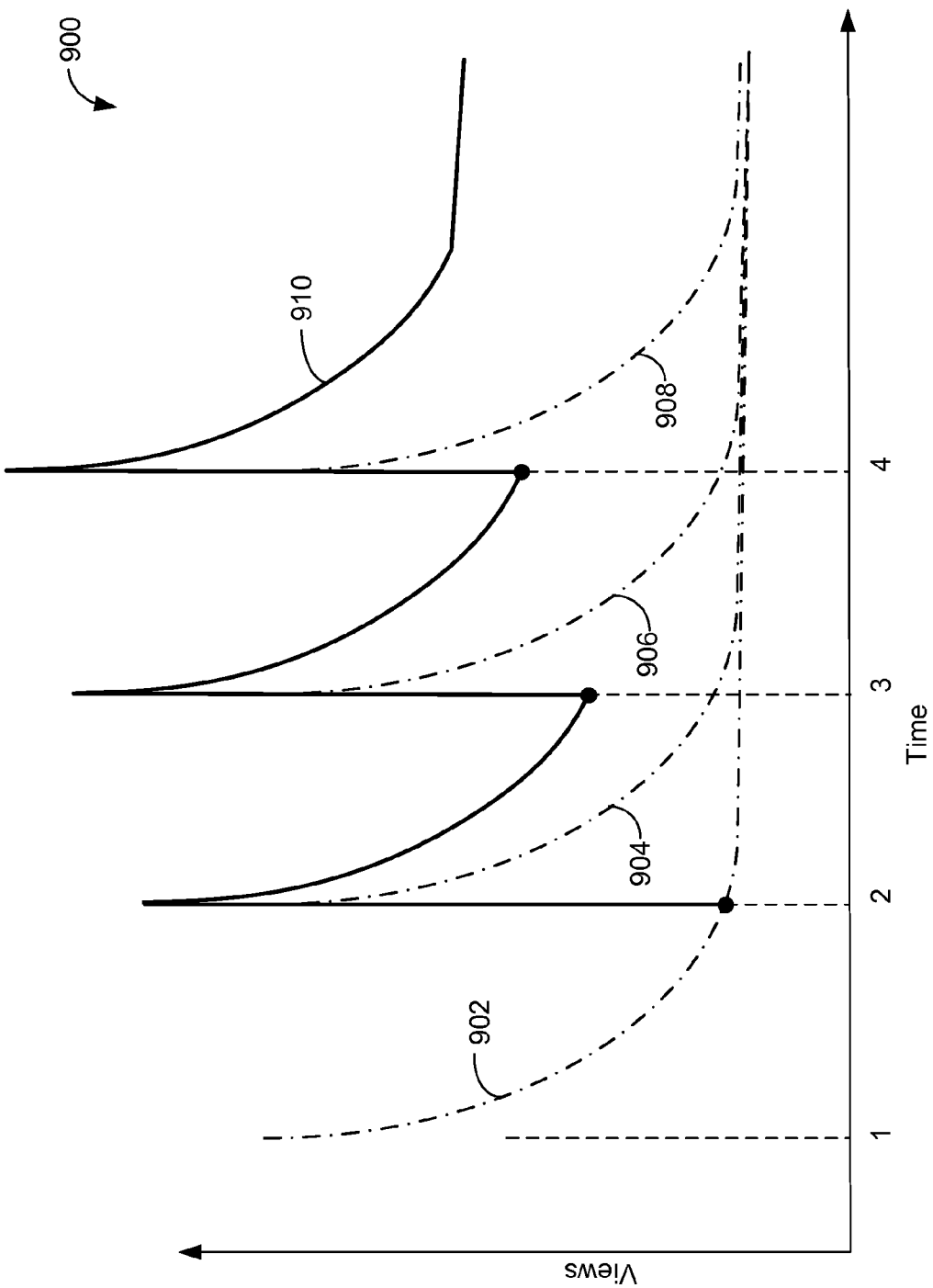
FIG. 9 is a diagram illustrating an example of a model of program views as a function of time for a program comprising serial episodes.

Viewership of certain types of video programming may be highly time-dependent. For example, viewership often peaks shortly after first release of content, and decays linearly with time after the release. In an aspect, an ad inventory analysis module may build, maintain and use a time-dependent model for estimating ad inventory to account for time-dependent viewership. FIG. 9 is a diagram 900 illustrating an example of a model of program views as a function of time for a program comprising serial episodes. The dashed lines 902, 904, 906 and 908 represent viewership decay as a function of time, for episodes of a program respectively released at times 1, 2, 3, 4 shown on the horizontal axis.

Each decay curve 902, 904, 906 and 908 may be defined by a function of time that is linear in 1/N, wherein 'N' represents days since first release of the respective episodes. For example, each decay curve may be approximated by the expression C+B/N, where 'C' and 'B' are empirically determined constants and 'N' is as previously described. The constants 'B' and 'C' may differ between different programs, demographics, day of week, or other targeted attributes. Other viewership curves may not be linear in 1/N; for example, viewership of promotional clips typically increases up to the release date of the primary program being promoted and decays rapidly thereafter. The solid line 910 represents total number of views as a function of time for a particular program or inventory category, given by a summation of the individual episode curves 902, 904, 906 and 908. Episode schedules may be used to determine the date and time at which new episodes are released, and expected decay curves for each new release may be extrapolated based on historical decay curves for the program or other inventory category (e.g., program limited by demographic attribute or other qualifier). For example, a future decay curve for an episode may be based on a historical curve for a most recent episode, or a rolling average of recent episodes.

For each program or other inventory category, a model-building module may determine a value for the constants 'B' and 'C' based on historical data, or other empirical values if a different viewership curve is used. An inventory estimation method based on such time-dependent models may aggregate selected time curves in any way consistent with the scope of a specified ad campaign to estimate the number of viewers that may be expected during the campaign period.

Figure 10:
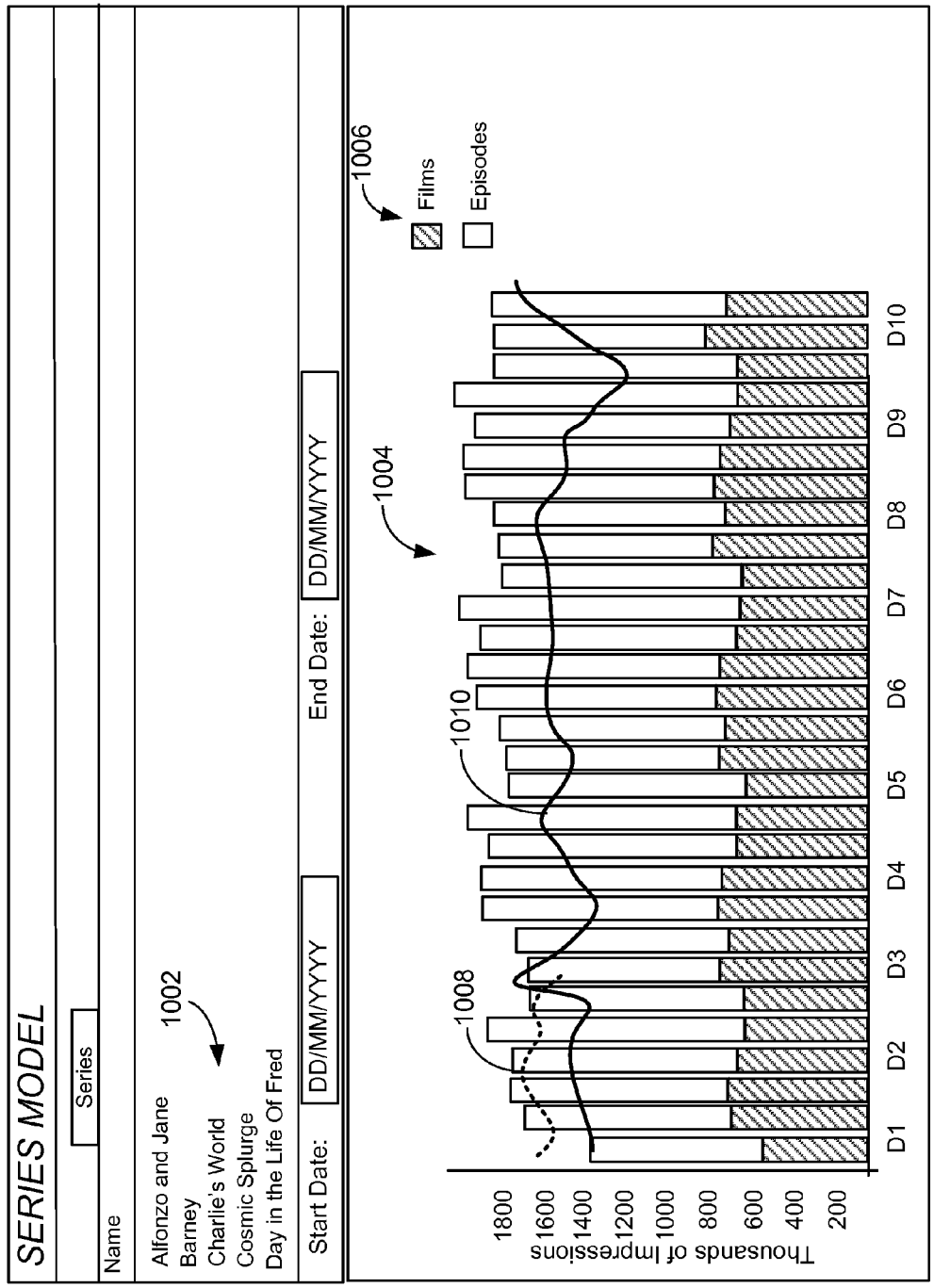
FIG. 10 is a screenshot illustrating a display of historical series views as a function of time in a graphical user interface for performing ad inventory management.

Results of such extrapolation and aggregation of time-dependent viewership curves may be displayed as system output in window 1000 of a graphical user interface, as shown in FIG. 10. The window 1000 may include a list 1002 of selected series for which the future time-dependent viewership curves are aggregated to obtain aggregate data 1004, wherein each data bar represents an aggregate estimated total viewership for respective ones of the dates from Apr. 2, 2012 to Apr. 30, 2012. As shown in the legend 1006, historical and extrapolated viewership estimates are included and aggregated in the total historical record or estimated viewership for each date. In the illustrated example, historical data and prior estimates are available for the dates Apr. 2, 2012 to Apr. 8, 2012, and estimates only are available for dates after Apr. 8, 2012. The curve 1008 represents historical data for Apr. 2, 2012 through Apr. 8, 2012, and the curve 1010 represents historical data for the prior year period Apr. 2, 2011 through Apr. 30, 2011.

Figures 11, 12:
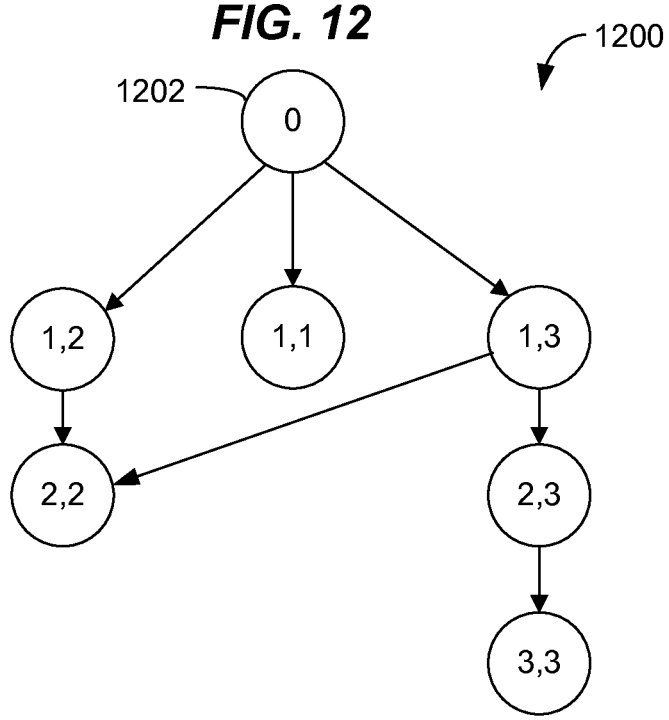
FIG. 11 is a diagram illustrating a simplified data structure for estimating ad inventory by targeted attribute categories.
FIG. 12 is a state diagram illustrating inventory counting for a multi-ad slot.

A method for estimating ad inventory may also account for interdependencies between different attributes. FIG. 11 shows a simplified data structure 1100 (e.g., data table) relating combinations of targeted attributes in columns 1102, 1104 and 1106 to inventory estimates (impression counts) in column 1108. By way of example, column 1102 lists gender values, column 1104 lists age range values, and column 1106 lists marketing area values. Each combination of attributes may sometime be referred to as a targeting cut; the number of targeting cuts tracked by the system should be less than or equal to the number of impressions. The use of combinations of attributes in each tracked targeting cut enables the interdependencies between different attributes to be accounted for. In summary, probabilities of an ad impression occurring may be tracked for representative combinations of attributes (tracked targeting cuts), extrapolated to a future ad campaign based on a probability distribution and an estimated total number of impressions for the targeted period, and then extracted over some subset of the targeted attributes defined by an inventory query to provide an estimate of impressions for the subset. Tables as shown in FIG. 11 may be used for tracking and for forecasting, wherein a tracking table holds modeled data based on sampling past ad impressions including a probability distribution for extrapolating a forecast distribution for a future time period. Forecasted data may be obtained from a tracking table by arithmetic operations based an estimated total future number of impressions for a time period, for example, an estimated number of future impressions from a time-dependent viewership model. More detailed description and examples of this method are provided in the discussion below.

In comparison to tracking and forecasting interdependent attributes, if each attribute is assumed to have an independent influence on the probability that an ad impression will occur for a particular combination of attributes, future ad impressions for the combination may be computed simply by multiplying the probabilities for each independent attribute. For example, the probability that a viewer will be male may be multiplied by a probability that an ad will be viewed during a science fiction program, to obtain a combined probability that an ad will be viewed by a male during a science fiction program. Although computationally efficient, this approach based on an assumed independence of attributes may often cause inaccurate forecasting, because many attributes may in fact exhibit interdependent behavior. For example, the probability that a viewer of an ad impression played during a science fiction program is male may be higher than the probability that viewers of all ad impressions during a time period will be male. This example illustrates a simple interdependency between a viewer gender attribute and program genre attribute. Many more complex interdependencies may be observed in real-world video streaming systems, which may be accounted for by the methods disclosed herein.

The table in FIG. 11 shows an example using only three attributes, wherein the first attribute (gender) has two possible values (male or female), the second attribute (age range) may have several values, for example five or six non-overlapping age ranges although any non-zero number of age ranges may be used, and the third attribute (market area) may have a very large number of different values. The simple example of FIG. 11 (wherein three attributes are combined to provide six targeting cuts) may be extended to a general case of 'A' attributes, wherein each $i^{th}$ attribute has '$A_i$' number of possible values. In this general case, the number of possible different targeting cuts may be expressed by the product of the attribute counts ($A_i$), which may be written as $\Pi A_i$, wherein each value of $A_i$ represents a count of possible values for a corresponding one of the attributes.

The number $\Pi A_i$ may be very large, depending on the number of attributes to be considered. For example, assuming twenty different attributes wherein a median value of the number of different values per attribute is about ten, the number $\Pi A_i$ may be of an order of magnitude about equal to $10^{20}$. A complete table including every possible different targeting cut for twenty such attributes would require about $10^{20}$ rows. Such a large data table would be very inefficient and may require impracticably immense computing resources. Moreover, such a table would detail many more targeting cuts than can possibly be fulfilled by a typical ad campaign. For example, the total number of ad impressions available in an ad campaign period may be on the order of about $10^6$ to $10^8$. Thus, depending on the number and possible values of attributes used for targeting, the number of relevant ad impressions may be many orders of magnitude smaller than the total possible number of targeting cuts. Were tables like FIG. 11 to be constructed for every possible targeting cut, which are orders of magnitude greater in number than the number of possible ad impressions, most rows of such tables would record zero impressions. Such a table would not provide an efficient solution to the problem of forecasting ad inventory for interdependent targeting attributes.

It would be desirable, therefore, to be able to accurately forecast ad impressions for a large number of different attributes in a way that accounts for interdependencies between attributes, without constructing overly large data tables or data structures. In one approach, such a table may be constructed by sampling actual impressions, and only recording an impression with a corresponding targeting cut for actual samples. Thus, each row of the table—corresponding to a multi-attribute targeting cut—will be related to a corresponding recorded count of one or more ad impressions.

Although it is possible to sample every ad impression during a time period, efficiency may be improved without introducing significant errors by randomly sampling a relatively small percentage of total ad impressions during a period. As a general rule, sampling error is inversely proportional to the square root of the number of samples taken, and directly proportional to the standard deviation of the probability distribution for the population from which the samples are taken. The situation is more complex for multi-variable distributions which may generally exhibit different distributions over different variables. However, the general principle of sampling a relatively small number of a large population to obtain a representative sample within an acceptable error level also applies to multi-variable samples. In the case of ad inventory forecasting with about twenty different tracking attributes, for a population on the order of $10^7$ impressions, a sample size on the order of $10^4$ samples may be expected to provide a reasonably accurate picture of a population distribution. Because many samples are likely to correspond to identical targeting cuts, the number of tracked targeting cuts may be substantially less than the number of samples. Samples may be taken by random selection from a total population of ad impressions for a tracked period. A resulting data table, which may be organized like the table of FIG. 11, represents an estimated or "modeled" probability distribution for a sampled population. The probability of each different combination of attributes (e.g., as represented by the first three rows of the table) may be determined by dividing each respective count (e.g., as shown in column four 1108 of the table) by the total number of samples taken (e.g., the total of all rows in column four).

For each targeting cut (i.e., each unique combination of attributes represented by first three columns of the table), a count of estimated inventory may be maintained in column 1108 based on a time-dependent viewership model for the ad campaign. For example, a probability distribution number modeled by a sample count of past impressions may be multiplied by a total number of estimated impressions for a defined future time period from the time-dependent viewership model, and divided by the total number of samples underlying the probability distribution, to obtain an estimated inventory for each targeting cut.

The count in 1108 may comprise more detailed information concerning types of available inventory, for example ad pod state. It should be appreciated that the data table 1100 is simplified for illustrative purposes, including simplified labels, identifiers and data structure, to better illustrate fundamental concepts of a data structure for use with the technology described herein. A similar but more sophisticated data structure may be used by an inventory estimation server to estimate ad inventory for a particular prospective ad campaign.

To improve efficiency of aggregating inventory for different subsets of the targeting cuts, each subset of a targeting cut may be represented by a corresponding unique value of a bit mask. The length of the bit mask in bits may equal the number of rows in the table. For example, the table 1100 has six rows, so a six-bit mask may be used. The bit mask may be used to quickly identify the subset of targeting cuts specified by an ad campaign using a logical comparison. For example, with reference to FIG. 11, an ad campaign directed specifically at females aged 18-29 in the New York metro area may use a bit mask applied via a logical AND to quickly locate the second row of the table, where an inventory of 50 units is indicated. That inventory may be further analyzed as consisting of different ad pod states as discussed below in connection with FIG. 12. It should be appreciated that in practice, thousands of different targeting cuts may be defined for calculating separate estimated ad inventories, and a typical ad campaign may be designed to direct video ads to a significant number (for example, hundreds) of the targeting cuts.

FIG. 12 is a state diagram 1200 illustrating inventory counting for a streaming video system that configures video ads in multi-ad pods of up to three ads per pod. Therefore, the state diagram includes seven nodes, which downstream of the root node 1202 are each characterized by a coordinate pair. The root node 1202 represents an ad pod to which no ads are allocated. For the remaining nodes, the first value in the coordinate pair represents a number of ads allocated to the pod. The second value in the pair represents a number of total ads that are allowed to be allocated to the pod, as determined from one or more ads already allocated to the pod. For example, the pair 1,1 indicates an ad pod that is allocated one ad that must run by itself without any other ads in the pod. The pair 1,2 indicates that the pod is allocated one ad that must run with one additional ad, the pair 2,3 indicates that the pod is allocated two ads that must run with one additional ad, and so forth. When estimating ad inventory based on a defined ad campaign, the ad estimator may characterize the inventory allocated to the different ad pod states shown in FIG. 12. This may be useful, for example, to prevent over-estimating ad inventory by counting too many ad opportunities in the same ad pod, when placement in the same pod is prohibited. An example of a report of ad inventory allocated to different ad pod states is illustrated in column 706 of FIG. 7.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Example Methodologies and Apparatus

As shown in FIG. 13, a computer server system may perform a method 1300 for ad inventory estimation in a video streaming system. The method 1300 may include, at 1310, determining a probability distribution of samples taken from electronic data records of ad impressions in an interactive online video streaming service, among a population comprising each different combination of targeted attributes recorded for each of the samples, using a computer analyzing the electronic data records. For example, a computer system may randomly sample a population of ad impressions to obtain an estimated probability distribution for targeting cuts corresponding to the samples taken. The probability distribution may be expressed as a count of samples taken corresponding to each different combination of attributes, for example as shown in FIG. 11. The count for each different combination of attributes may be normalized to express a probability, by dividing each count by the total number of samples taken.

The method 1300 may further include, at 1320, populating an electronic data structure in a computer memory relating the each different combination of the targeted attributes to a forecasted number of available impressions in a defined time period, based on the probability distribution and a forecasted number of available impressions in the time period. For example, extrapolated future ad views may be allocated to a data table as shown in FIG. 11, by multiplying each count in the respective rows of the table by a ratio of total number of projected ad views in the defined time period to the number of samples taken for the probability distribution. The total number of projected ad views in the time period may be based on the time-dependent viewership model. For example, total forecast ad impressions may be determined from forecast total viewership during the period based on historical or assumed ad impressions per viewer, and/or per program, for a defined time period and targeted program collection.

The method 1300 may further include, at 1330, estimating an inventory number of impressions in a program collection in the defined time period available for targeting ads to be included in streamed ones of the program collection providing ad impressions having a defined set of targeted attributes, based on the electronic data structure. For example, the server may use a bit masking logical comparison operation to identify targeting cuts in an ad campaign, and then sum inventory tabulated for the identified targeting cuts. The defined set of targeted attributes may consist of a subset of the total number of attributes included in the each different combination of targeted attributes, because specifying all attributes would result in a very narrowly focused campaign likely of minimal value or effect. For example, if the system tracks about twenty different attributes, an inventory query for an ad campaign might be likely to specify between one to ten attributes specifically targeted by the ad campaign (i.e., the "defined set of targeted attributes"), and more likely between one and about five. The method 1300 operations should provide an inventory estimate that accounts for the effects of interdependence between different targeted attributes on available ad impressions, for ad campaigns wherein the number of targeted attributes is greater than one.

With reference to FIGS. 14-17, several additional operations 1400, 1500, 1600 and 1700 are depicted for estimating ad inventory for an ad campaign, which may be performed by a computer server, alone or in combination with a client device and/or another server. One or more of operations 1400, 1500, 1600 and 1700 may optionally be performed as part of method 1300. The elements 1400, 1500, 1600 and 1700 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1300 includes at least one of the operations 1400, 1500, 1600 and 1700, then the method 1300 may terminate after the at least one operation, without necessarily having to include any subsequent downstream operation(s) that may be illustrated.

Figure 14:
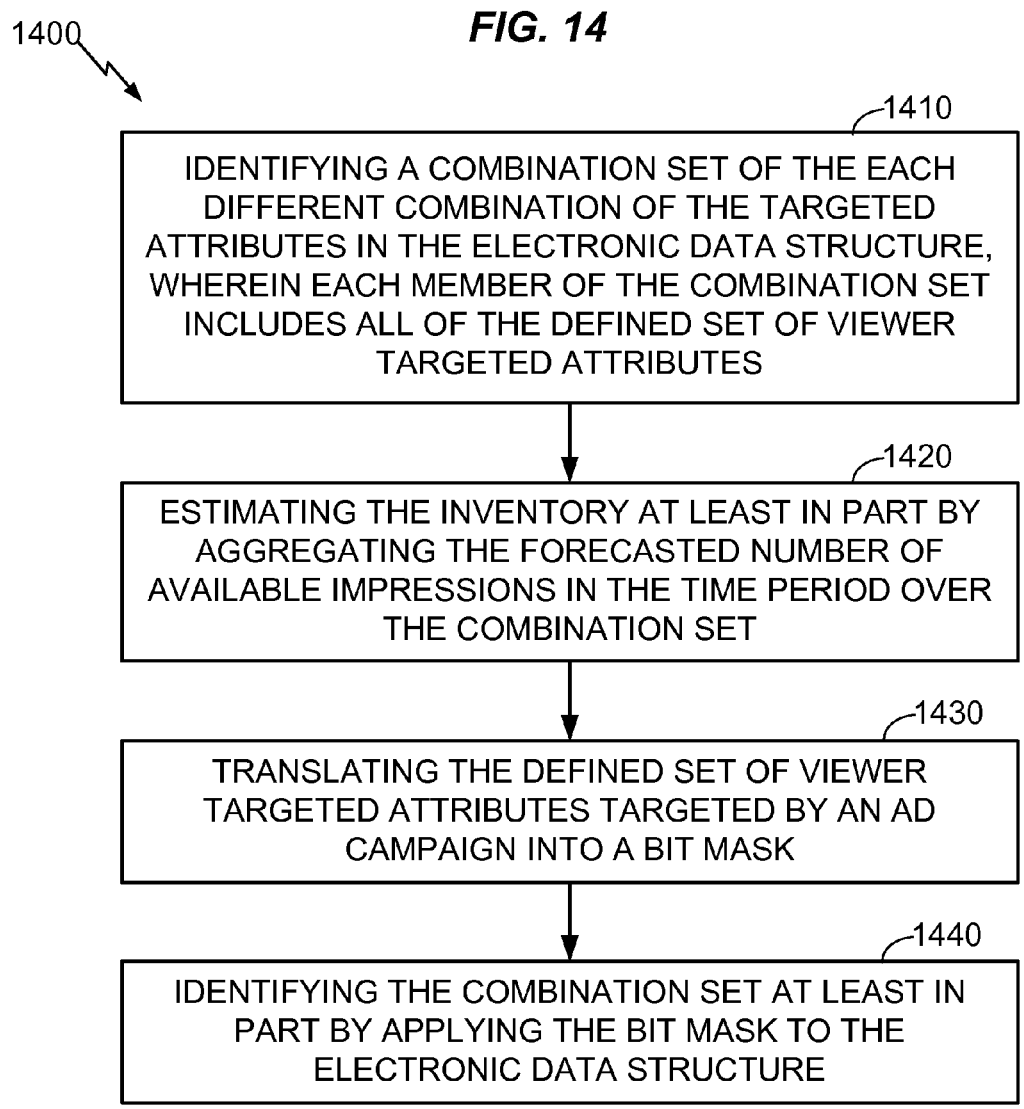

In an aspect, with reference to FIG. 14, the method 1300 may further include additional operations 1400 for estimating ad inventory. The additional operations may include, at 1410, identifying a combination set of the each different combination of the targeted attributes in the electronic data structure, wherein each member of the combination set includes all of the defined set of targeted attributes. For example, if the set of targeted attributes defined by a query consists of four attributes, the combination set will consist of those members of all of the each different combination of the targeted attributes (e.g., each row of a table like that in FIG. 11, but with additional attribute columns) that includes all four of the set of targeted attributes. The method 1300 may further include, at 1420, estimating the inventory at least in part by aggregating the forecasted number of available impressions in the time period over the combination set. For example, the system may sum all of the forecasted available impressions for ones of the different combinations of the targeted attributes (e.g., each targeting cut) that is included in combination set. The method 1300 may further include, at 1430, translating the defined set of targeted attributes targeted by an ad campaign into a bit mask. The method 1300 may further include, at 1440, identifying the combination set at least in part by applying the bit mask to the electronic data structure.

In other aspects, with reference to FIG. 15, the method 1300 may further include additional operations 1500 for estimating ad inventory. The additional operations may include, at 1510, organizing the forecasted number of impressions for the each different combination of the targeted attributes in the electronic data structure into a state table based on impressions per ad of multiple ad pods defined for each program. Further details are discussed above in connection with FIG. 12. In an aspect, the method 1300 may further include, at 1520, decrementing the forecasted number of available impressions in the time period related to the each of different combinations of the targeted attributes in the electronic data structure, based on ad impressions sold. In addition, the method 1300 may further include, at 1530, including in the each different combination of the targeted attributes at least two different attributes selected from the group consisting of: viewer profile gender, viewer profile age, program recommendation age, viewer predicted age, viewer predicted gender, location of player device, user profile location, genre of video program, and type of player device.

Figure 16:
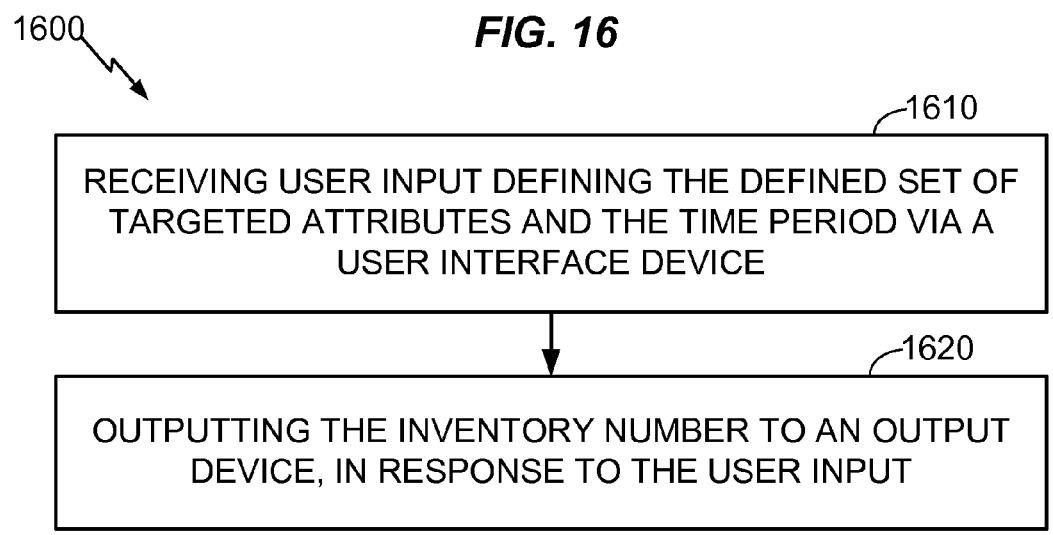

With reference to FIG. 16, the method 1300 may further include additional operation 1600 for input and output. The method 1300 may include, at 1610, receiving user input defining the defined set of targeted attributes and the time period via a user interface device. The method 1300 may further include, at 1620, outputting the inventory number to an output device, in response to the user input.

In aspects, with reference to FIG. 17, the method 1300 may further include additional operations 1700 for modeling future time-dependent viewership. The additional operations may include, at 1710, forecasting individual programs of the program collection at least with respect to a time schedule of new episodes to be released during the time period. In such case, the method 1300 may further include, at 1720, defining a time-dependent projected viewership function for each program, for example by summing time-dependent curves for individual episodes of the program based on a schedule of expected episode release dates.

In addition, the method 1300 may further include, at 1730, defining the time-dependent projected viewership function for each program at least in part by summing a series of time-dependent projected viewership functions for individual episodes forecasted for each program. In such case, the method 1300 may further include, at 1740, defining each of the time-dependent projected viewership functions for the individual episodes as a linear function in 1/N, wherein 'N' represents time since initial release of a respective corresponding one of the individual episodes. For further example, the method 1300 may include, at 1750, defining the linear function in 1/N characterized by C+B/N, wherein 'C' and 'B' are constants determined from historical data. In such case, the method 1300 may further include, at 1760, determining a value for the constants 'C' and 'B' by analyzing viewership records for the individual episodes of each program. The linear function may be determined and defined separately for each attribute.

In another aspect, the method 1300 may further include, at 1770, determining the total projected viewership for each program in the time period as electronic data stored in a computer memory, by integrating the time-dependent projected viewership function for each program over the time period.

Figure 18:
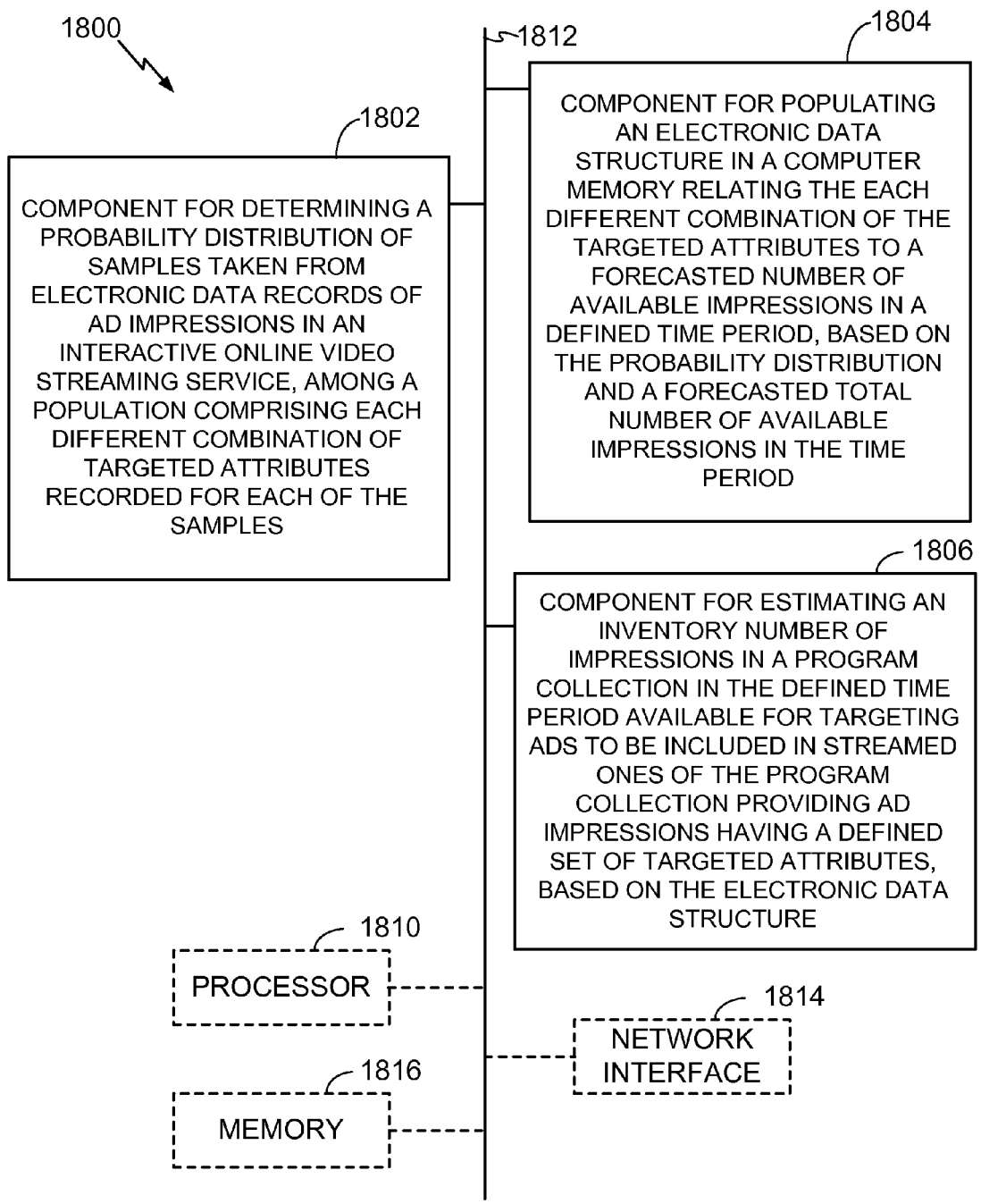
FIG. 18 is a diagram illustrating a computer server configured for ad inventory management.

With reference to FIG. 18, there is provided an exemplary apparatus 1800 that may be configured as computer server, client device, or combination of client and server, for ad inventory management. The apparatus 1800 may include functional blocks that can represent functions implemented by a processor, software, or combination thereof (e.g., firmware).

As illustrated, in one embodiment, the apparatus 1800 may include an electrical component or means 1802 for determining a probability distribution of samples taken from electronic data records of ad impressions in an interactive online video streaming service, among a population comprising each different combination of targeted attributes recorded for each of the samples. For example, the electrical component or means 1802 may include at least one control processor 1810 coupled to a memory component 1816. The control processor may operate an algorithm, which may be held as program instructions in the memory component. The algorithm may include, for example, selecting samples from records of ad impressions in an interactive online video streaming service, determining a combination of targeted attributes recorded for each of the samples, and determining a probability distribution of the samples among a population comprising each different combination of the targeted attributes, for example by allocating sample counts to a data structure as shown in FIG. 11. The number of samples taken may be equal to or less than the number of ad impressions in a sampled set.

The apparatus 1800 may further include an electrical component or module 1804 for populating an electronic data structure in a computer memory relating the each different combination of the targeted attributes to a forecasted total number of available impressions in a defined time period, based on the probability distribution and a forecasted total number of available impressions in the time period. For example, the electrical component or means 1804 may include at least one control processor 1810 coupled to a memory component 1816. The control processor may operate an algorithm, which may be held as program instructions in the memory component. The algorithm may include, for example, allocating extrapolated future ad views to corresponding rows of a data table as shown in FIG. 11, or equivalent data structure by multiplying a forecast total number of impression for the defined time period by each respective probability for each row (or different combination of attributes) of the historical probability distribution determined by the component 1802.

The apparatus 1800 may further include an electrical component or module 1806 for estimating an inventory number of impressions in a program collection in the defined time period available for targeting ads to be included in streamed ones of the program collection providing ad impressions having a defined set of targeted attributes, based on the electronic data structure. For example, the electrical component or means 1806 may include at least one control processor 1810 coupled to a memory component 1816. The control processor may operate an algorithm, which may be held as program instructions in the memory component. The algorithm may include, for example, applying a bit masking logical comparison operation to identify specific targeting cuts defined for an ad campaign in a data structure in which estimated inventories are allocated to specific targeting cuts, and then summing inventory tabulated for the identified targeting cuts.

The apparatus 1800 may include similar electrical components for performing any or all of the additional operations 1400, 1500, 1600 and 1700 described in connection with FIGS. 14-17, which for illustrative simplicity are not shown in FIG. 18.

In related aspects, the apparatus 1800 may optionally include a processor component 1810 having at least one processor, in the case of the apparatus 1800 configured as a network entity. The processor 1810, in such case may be in operative communication with the components 1802-1806 or similar components via a bus 1812 or similar communication coupling. The processor 1810 may effect initiation and scheduling of the processes or functions performed by electrical components 1802-1806.

In further related aspects, the apparatus 1800 may include a network interface component 1814 enabling communication between a client and a server. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for implementing the processes and behavior of the components 1802-1806, and subcomponents thereof, or the processor 1810, or the methods disclosed herein. The memory component 1816 may retain instructions for executing functions associated with the components 1802-1806. While shown as being external to the memory 1816, it is to be understood that the components 1802-1806 can exist within the memory 1816.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical discs or magnetic disks, such as used in a data storage device or medium. Volatile media may include dynamic memory, such as a main or cache memory for a computer processor. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, solid-state drive (SSD), or any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for estimating ad inventory in a video streaming system, by at least one computer, the method comprising:
   streaming, by a video streaming service, videos to clients using the video streaming system, wherein the video streaming service offers a program collection of videos that are available for requesting by the clients;
   storing electronic data records for ad impressions from advertisements played during the videos;
   determining a probability distribution of samples randomly taken from the electronic data records of the ad impressions during a first time period, among a population comprising a first combination set of targeted attributes, wherein the samples randomly taken for each of the samples comprise a second combination set of targeted attributes, and wherein the second combination set has fewer combinations than the first combination set;
   receiving an ad campaign defined by a set of parameters, the ad campaign to run for a second time period defined in the set of parameters on the video streaming service, wherein the ad campaign includes a query for a combination of targeted attributes;
   determining individual programs in the program collection being offered by the video streaming service based on the set of parameters and the combination of targeted attributes;
   forecasting which individual programs of the program collection will be released at least with respect to a time schedule of new episodes to be released during the second time period;
   defining a time-dependent projected viewership function for each program at least in part by summing a series of time-dependent projected viewership functions for individual episodes forecasted for each program, wherein each time-dependent projected viewership function comprises a linear function characterized by $C+B/N$, wherein 'C' and 'B' are constants, and 'N' represents time since initial release of a respective corresponding one of the individual episodes based on the time schedule of new episodes;
   determining a value for the constants 'C' and 'B' by analyzing viewership records for the individual episodes of each program;
   populating an electronic data structure in a computer memory relating each different combination of the targeted attributes in the second combination set to a forecasted number of available impressions in the second time period, based on the probability distribution and a forecasted total number of available impressions in the second time period that is determined based on the time-dependent viewership functions for the individual programs;
   identifying the forecasted number of available impressions in the electronic data structure for each different combination in the second combination set of the targeted attributes;
   estimating an inventory number of impressions for each different combination in the second combination set of the targeted attributes in the second time period that is available for targeting ads to be included in streamed videos of the program collection providing ad impressions having the first combination set of targeted attributes by multiplying the forecasted number of available impressions by a ratio of the forecasted total number of available impressions to a number of samples taken for the probability distribution; and retrieving the estimated inventory number of impressions from the electronic data structure based on the combination of targeted attributes being stored in the electronic data structure in an entry.

2. The method of claim 1, wherein each member of the combination set includes a different combination of the targeted attributes.

3. The method of claim 2, wherein estimating the inventory number at least in part by aggregating the forecasted number of available impressions in the second time period over the second combination set.

4. The method of claim 2, further comprising translating the second combination set of the targeted attributes into a bit mask.

5. The method of claim 4, further comprising identifying the combination of targeted attributes at least in part by applying the bit mask to the electronic data structure.

6. The method of claim 1, further comprising organizing the forecasted number of impressions for each different combination of the second combination set of the targeted attributes in the electronic data structure into a state table based on impressions per ad of multiple ad pods defined for each program.

7. The method of claim 1, further comprising decrementing the forecasted number of available impressions in the second time period related to each different combination of the second combination set of the targeted attributes in the electronic data structure, based on ad impressions sold.

8. The method of claim 1, further comprising receiving user input defining the first combination set of targeted attributes and the first time period and the second time period via a user interface device.

9. The method of claim 8, further comprising outputting the inventory number to an output device, in response to the user input.

10. The method of claim 8, further comprising determining a total projected viewership for each program in the second time period as electronic data stored in a computer memory, by integrating the time-dependent projected viewership function for each program over the second time period.

11. The method of claim 1, further comprising including in each different combination of the second combination set of the targeted attributes at least two different attributes selected from the group consisting of: viewer profile gender, viewer profile age, program recommendation age, viewer predicted age, viewer predicted gender, location of player device, user profile location, genre of video program, and type of player device.

12. An apparatus, comprising:
at least one computer processor configured for:
streaming, by a video streaming service, videos to clients using the video streaming system, wherein the video streaming service offers a program collection of videos that are available for requesting by the clients;
storing electronic data records for ad impressions from advertisements played during the videos;
determining a probability distribution of samples randomly taken from the electronic data records of the ad impressions during a first time period, among a population comprising a first combination set of targeted attributes, wherein the samples randomly taken for each of the samples comprise a second combination set of targeted attributes, and wherein the second combination set has fewer combinations than the first combination set;
receiving an ad campaign defined by a set of parameters, the ad campaign to run for a second time period defined in the set of parameters on the video streaming service, wherein the ad campaign includes a query for a combination of targeted attributes;
determining individual programs in the program collection being offered by the video streaming service based on the set of parameters and the combination of targeted attributes;
forecasting which individual programs of the program collection will be released at least with respect to a time schedule of new episodes to be released during the second time period;
defining a time-dependent projected viewership function for each program at least in part by summing a series of time-dependent projected viewership functions for individual episodes forecasted for each program, wherein each time-dependent projected viewership function comprises a linear function characterized by C+B/N, wherein 'C' and 'B' are constants, and 'N' represents time since initial release of a respective corresponding one of the individual episodes based on the time schedule of new episodes;
determining a value for the constants 'C' and 'B' by analyzing viewership records for the individual episodes of each program;
populating an electronic data structure in a computer memory relating each different combination of the targeted attributes in the second combination set to a forecasted number of available impressions in the second time period, based on the probability distribution and a forecasted total number of available impressions in the second time period that is determined based on the time-dependent viewership functions for the individual programs;
identifying the forecasted number of available impressions in the electronic data structure for each different combination in the second combination set of the targeted attributes;
estimating an inventory number of impressions for each different combination in the second combination set of the targeted attributes in the second time period that is available for targeting ads to be included in streamed videos of the program collection providing ad impressions having the first combination set of targeted attributes by multiplying the forecasted number of available impressions by a ratio of the forecasted total number of available impressions to a number of samples taken for the probability distribution;
retrieving the estimated inventory number of impressions from the electronic data structure based on the combination of targeted attributes being stored in the electronic data structure in an entry; and
a memory coupled to the at least one computer processor for storing data.

13. The apparatus of claim 12, wherein each member of the combination set includes a different combination of the targeted attributes.

14. The apparatus of claim 13, wherein the computer processor is further configured for estimating the inventory number at least in part by aggregating the forecasted number of available impressions in the second time period over the second combination set.

15. The apparatus of claim 13, wherein the computer processor is further configured for translating the second combination set of the targeted attributes into a bit mask.

16. The apparatus of claim 15, wherein the computer processor is further configured for identifying the combination of targeted attributes in least in part by applying the bit mask to the electronic data structure.

17. The apparatus of claim 12, wherein the computer processor is further configured for organizing the forecasted number of impressions for each different combination of the second combination set of the targeted attributes in the electronic data structure into a state table based on impressions per ad of multiple ad pods defined for each program.

18. The apparatus of claim 12, wherein the computer processor is further configured for decrementing the forecasted number of available impressions in the second time period related to each different combination of the second combination set of the targeted attributes in the electronic data structure, based on ad impressions sold.

19. The apparatus of claim 12, wherein the computer processor is further configured for receiving user input defining the first combination set of targeted attributes and the first time period and second time period via a user interface device.

20. The apparatus of claim 19, wherein the computer processor is further configured for outputting the inventory number to an output device, in response to the user input.

21. The apparatus of claim 12, wherein the computer processor is further configured for determining a total projected viewership for each program in the second time period as electronic data stored in a computer memory, by integrating the time-dependent projected viewership function for each program over the second time period.

22. The apparatus of claim 12, wherein the computer processor is further configured for including in each different combination of the second combination set of the targeted attributes at least two different attributes selected from the group consisting of: viewer profile gender, viewer profile age, program recommendation age, viewer predicted age, viewer predicted gender, location of player device, user profile location, genre of video program, and type of player device.

23. A computer program product, comprising:
a non-transitory computer-readable medium holding coded instructions, that when executed by a computer processor, cause the computer processor to perform the operations of:
streaming, by a video streaming service, videos to clients using the video streaming system, wherein the video streaming service offers a program collection of videos that are available for requesting by the clients;
storing electronic data records for ad impressions from advertisements played during the videos;
determining a probability distribution of samples randomly taken from the electronic data records of the ad impressions during a first time period, among a population comprising a first combination set of targeted attributes, wherein the samples randomly taken for each of the samples comprise a second combination set of targeted attributes, and wherein the second combination set has fewer combinations than the first combination set;
receiving an ad campaign defined by a set of parameters, the ad campaign to run for a second time period defined in the set of parameters on the video streaming service, wherein the ad campaign includes a query for a combination of targeted attributes;
determining individual programs in the program collection being offered by the video streaming service based on the set of parameters and the combination of targeted attributes;
forecasting which individual programs of the program collection will be released at least with respect to a time schedule of new episodes to be released during the second time period;
defining a time-dependent projected viewership function for each program at least in part by summing a series of time-dependent projected viewership functions for individual episodes forecasted for each program, wherein each time-dependent projected viewership function comprises a linear function characterized by C+B/N, wherein 'C' and 'B' are constants, and 'N' represents time since initial release of a respective corresponding one of the individual episodes based on the time schedule of new episodes;
determining a value for the constants 'C' and 'B' by analyzing viewership records for the individual episodes of each program;
populating an electronic data structure in a computer memory relating each different combination of the targeted attributes in the second combination set to a forecasted number of available impressions in the second time period, based on the probability distribution and a forecasted total number of available impressions in the second time period that is determined based on the time-dependent viewership functions for the individual programs;
identifying the forecasted number of available impressions in the electronic data structure for each different combination in the second combination set of the targeted attributes;
estimating an inventory number of impressions for each different combination in the second combination set of the targeted attributes in the second time period that is available for targeting ads to be included in streamed videos of the program collection providing ad impressions having the first combination set of targeted attributes by multiplying the forecasted number of available impressions by a ratio of the forecasted total number of available impressions to a number of samples taken for the probability distribution; and
retrieving the estimated inventory number of impressions from the electronic data structure based on the combination of targeted attributes being stored in the electronic data structure in an entry.

* * * * *